(12) United States Patent
Yu et al.

(10) Patent No.: US 10,085,024 B2
(45) Date of Patent: Sep. 25, 2018

(54) LOOKUP TABLE FOR RATE DISTORTION OPTIMIZED QUANTIZATION

(71) Applicant: QUALCOMM Incorporated, San Diego, CA (US)

(72) Inventors: Yang Yu, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 585 days.

(21) Appl. No.: 13/800,268

(22) Filed: Mar. 13, 2013

(65) Prior Publication Data
US 2013/0272386 A1 Oct. 17, 2013

Related U.S. Application Data

(60) Provisional application No. 61/623,929, filed on Apr. 13, 2012, provisional application No. 61/623,948, (Continued)

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/126* | (2014.01) |
| *H04N 19/147* | (2014.01) |

(Continued)

(52) U.S. Cl.
CPC ......... *H04N 19/126* (2014.11); *H04N 19/147* (2014.11); *H04N 19/149* (2014.11); *H04N 19/172* (2014.11); *H04N 19/18* (2014.11)

(58) Field of Classification Search
CPC .............................. H04N 19/126; H04N 19/61
USPC ..................................................... 375/240.03
See application file for complete search history.

(56) References Cited

U.S. PATENT DOCUMENTS

| | | | |
|---|---|---|---|
| 5,926,222 A | 7/1999 | Nickerson | |
| 7,889,790 B2 * | 2/2011 | Sun | ...................... H04N 19/126 375/240.03 |

(Continued)

FOREIGN PATENT DOCUMENTS

| | | |
|---|---|---|
| CN | 1973547 A | 5/2007 |
| EP | 2157798 A1 | 2/2010 |

(Continued)

OTHER PUBLICATIONS

Liu, Y. (Jun. 21, 2009). Quantization Techniques in JM/KTA. Retrieved from H265.net:http://www.h265.net/2009/06/quantization-techniques-in-jmkta-part-1.html/trackback.*

(Continued)

*Primary Examiner* — Tat C Chio
*Assistant Examiner* — Fabio S Lima
(74) *Attorney, Agent, or Firm* — Shumaker & Sieffert, P.A.

(57) ABSTRACT

A computing device, such as a video encoder, uses respective positions of respective coefficients in a coefficient block to look up, in a lookup table, respective quantization offsets for the respective coefficients. Furthermore, the computing device determines, based at least in part on the quantization offsets for the one or more coefficients, respective quantized levels for the respective coefficients.

24 Claims, 12 Drawing Sheets

Related U.S. Application Data filed on Apr. 13, 2012, provisional application No. 61/624,116, filed on Apr. 13, 2012.

(51) Int. Cl.
*H04N 19/172* (2014.01)
*H04N 19/149* (2014.01)
*H04N 19/18* (2014.01)

(56) References Cited

U.S. PATENT DOCUMENTS

| | | | |
|---|---|---|---|
| 8,130,828 B2 | 3/2012 | Hsu et al. | |
| 8,155,195 B2 | 4/2012 | Regunathan et al. | |
| 8,160,136 B2 | 4/2012 | Sezer | |
| 8,233,545 B2 | 7/2012 | Ahuja et al. | |
| 8,254,443 B2 | 8/2012 | Dencher | |
| 2007/0002946 A1* | 1/2007 | Bouton | H04N 19/15 375/240.01 |
| 2007/0140334 A1* | 6/2007 | Sun | H04N 19/126 375/240.03 |
| 2008/0037656 A1* | 2/2008 | Hannuksela | H04N 21/23614 375/240.26 |
| 2008/0080615 A1 | 4/2008 | Tourapis et al. | |
| 2011/0019736 A1* | 1/2011 | Koyabu | H04N 19/00187 375/240.03 |
| 2011/0200101 A1 | 8/2011 | Zan et al. | |
| 2011/0255589 A1* | 10/2011 | Saunders | H04N 19/176 375/240.01 |
| 2012/0044990 A1 | 2/2012 | Bivolarsky et al. | |
| 2012/0099646 A1 | 4/2012 | Coban et al. | |
| 2012/0328003 A1* | 12/2012 | Chien | H04N 19/176 375/240.03 |
| 2013/0169760 A1* | 7/2013 | Watts | G06K 9/40 348/47 |
| 2013/0188013 A1* | 7/2013 | Chen | H04N 19/597 348/43 |
| 2013/0272385 A1 | 10/2013 | Yu et al. | |
| 2014/0161189 A1* | 6/2014 | Zhang | H04N 19/0043 375/240.16 |

FOREIGN PATENT DOCUMENTS

| | | |
|---|---|---|
| JP | 2008503918 A | 2/2008 |
| JP | 2011176483 A | 9/2011 |
| WO | 2006007279 A2 | 1/2006 |
| WO | 2007005750 A2 | 1/2007 |
| WO | 2011031692 A2 | 3/2011 |

OTHER PUBLICATIONS

Seregin, V. LCEC RDOQ Speedup. Joint Collaborative Team on Video Coding (JCT-VC) of ITU-T SG16 WP3 and ISO/IEC JTC1/SC29/WG11 4th Meeting: Daegu, KR, Jan. 20-28, 2011).*
Karczewtcz, C. Unified Scans for the Significance Map and Coefficient Level Coding in High Coding Efficiency. Joint Collaborative Team on Video Coding (JCT-VC) of ITU-T SG16 WP3 and ISO/IEC JTC1/SC2.9AVGJ.3I 5th Meeting: Geneva, CM, Mar.6-23, 2011).*
Xu et al. "A fine rate control algorithm with adaptive rounding offsets (ARO)." IEEE Transactions on circuits and Systems for Video Technology19.10 (2009): 1424-1435.*
Response to Written Opinion dated Jul. 25, 2013, from International Application No. PCT/US2013/031609, filed Sep. 23, 2013, 10 pp.
Second Written Opinion from International Application No. PCT/US2013/031609, dated Mar. 24, 2014, 7 pp.
Response to Second Written Opinion dated Mar. 24, 2014, from International Application No. PCT/US2013/031609, filed May 23, 2014, 18 pp.
International Preliminary Report on Patentability from International Application No. PCT/US2013/031609, dated Jun. 13, 2014, 6 pp.

Seregin, et al., "LCEC RDOQ speedup", MPEG Meeting, Jan. 24-28, 2011, Daegu, (Motion Picture Expert Group or ISO/IEC JTC1/SC29/WG11 ), No. m19261, XP030047828, 2 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 2012, JCTVC-11003_d2, 290 pp.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, pp. 290.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Farin et al., "Rate-Distortion Optimal Adaptive Quantization and Coefficient Thresholding for MPEG Coding", Symposium on Information Theory in the Benelux, May 1, 2002, pp. 131-138, XP002528197.
International Search Report and Written Opinion—PCT/US2013/031609—ISA/EPO, dated Jul. 25, 2013, 19 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Karczewicz et al., "Modifications for CAVLC RDOQ", JCT-VC Meeting; MPEG Meeting; Jul. 14-22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F296, XP030009319, 4 pp.
Karczewicz et al., "Rate distortion optimized quantization", JVT Meeting; Apr. 24-29, 2008; Geneva; (Joint Video Team ofISO/IEC JTC1/SC29/WG11 and ITU-T SG.16), No. JVT-AA026, XP030007369, ISSN: 0000-0091, 8 pp.
Karczewicz et al., "Rate distortion optimized quantization", VCEG Meeting; MPEG Meeting; Jan. 12-13, 2008; Antalya; (Video Coding Experts Group of ITU-T SG.16), No. VCEG-AH21, XP030003559, ISSN: 0000-0138, 3 pp.
Liu et al., "Rate distortion optimized quantization in the JM sef software", JVT Meeting; Apr. 24-29, 2008; Geneva (Joint Video Team ofISO/IEC JTC1/SC29/WG11 and ITU-T SG.16), No. JVT-AA027, XP030007370, ISSN: 0000-0091, 7 pp.
Partial International Search Report—PCT/US2013/031609—ISA/EPO, Jun. 7, 2013, 7 pp.

(56) References Cited

OTHER PUBLICATIONS

Seregin et al., "LCEC RDOQ speedup", JCT-VC Meeting; MPEG Meeting; Jan. 20-28, 2011; Daegu; (Joint Colloborative Team on Video Coding of ISO/IEC JTC1/SC29/WG11and ITU-T SG. 16); URL: http://wftp3.itu.int/av-arch/jctvc-site/,, No. JCTVC-D416, XP030008455, 2 pp.

Sole et al., "Unified scans for the significance map and coefficient level coding in high coding efficiency," Document JCTVC-E335, 5th Meeting: Geneva, CH, Mar. 16-23, 2011, 5 pp.

Wang X., et al., "Fine Granularity QP Offset", MPEG Meeting; Jul. 14-22, 2011; Torino; (Motion Picture Expert Group or ISO/IEC JTC1/SC29/WG11), No. m21044, XP030049607, 6 pp.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Yu X et al., "Improved quantization for HEVC", JCT-VC Meeting; Jul. 21-28, 2010; Geneva; (Joint Collaborative Team on Video Coding of ISO/IEC JTC1/SC29/WG11 and ITU-TSG.16); URL:http://wftp3.itu.int/av-arch/jctvc-site// No. JCTVC-8035, XP030007615, ISSN: 0000-0048, 5 pp.

Yu et al., Quantization with Hard-decision Partition and Adaptive Reconstruction Levels for low delay setting, MPEG Meeting; Jan. 20-28, 2011; Daegu; (Motion Picture Expert Group or ISO/IEC JTC1/SC29/WG11), No. m19162, XP030047729, 4 pp.

Invitation to Pay Additional Fees from international application No. PCT/US2013/031609, dated Jun. 7, 2013, 7 pp.

Bross, et al., "High efficiency video Coding (HEVC) text specification draft 6," Joint Collaborative Team on Video Coding (JCT-VC) of ITU-T SG16 WP3 and ISO/IEC JTC1/SC29/WG11, Document: JCTVC-H1003, 7th Meeting: Geneva, CH, Nov. 21-30, 2011, Version 2, Apr. 2, 2012, 259 pp.

Bross, B., et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Document: JCTVC-K1003_v8, Nov. 7, 2012, 292 pp.

\* cited by examiner

LOOKUP TABLE FOR RATE DISTORTION OPTIMIZED QUANTIZATION

This application claims the benefit of U.S. Provisional Patent Application No. 61/623,929, filed Apr. 13, 2012, U.S. Provisional Patent Application No. 61/623,948, filed Apr. 13, 2012, and U.S. Provisional Patent Application No. 61/624,116, filed Apr. 13, 2012, the entire content of each of which is incorporated herein by reference.

TECHNICAL FIELD

This disclosure relates to video coding and compression and, in particular, to the implementation of rate distortion optimized quantization in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes quantization techniques. In some examples, a computing device, such as a video encoder, stores a lookup table. The lookup table includes entries that map positions within coefficient blocks to quantization offsets. The computing device uses respective positions of respective coefficients in a coefficient block to look up, in the lookup table, respective quantization offsets for the respective coefficients. Furthermore, the computing device determines, based at least in part on the quantization offsets for the one or more coefficients, quantized levels for the coefficients.

In one example, this disclosure describes a method of encoding video data. The method comprises using respective positions of respective coefficients in a coefficient block to look up, in a lookup table, respective quantization offsets for the respective coefficients. The method also comprises determining, based at least in part on the respective quantization offsets for the one or more respective coefficients, respective quantized levels for the respective coefficients.

In another example, this disclosure describes a computing device that encodes video data. The computing device comprises one or more processors configured to use respective positions of respective coefficients in a coefficient block to look up, in a lookup table, respective quantization offsets for the respective coefficients. In addition, the one or more processors are configured to determine, based at least in part on the respective quantization offsets for the one or more respective coefficients, respective quantized levels for the respective coefficients.

In another example, this disclosure describes a computing device that encodes video data. The computing device comprises means for using respective positions of respective coefficients in a coefficient block to look up, in a lookup table, respective quantization offsets for the respective coefficients. In addition, the computing device comprises means for determining, based at least in part on the respective quantization offsets for the one or more respective coefficients, respective quantized levels for the respective coefficients.

In another example, this disclosure describes a computer-readable storage medium that stores instructions that, when executed by one or more processors of a computing device, configure the computing device to use respective positions of respective coefficients in a coefficient block to look up, in a lookup table, respective quantization offsets for the respective coefficients. The instructions also configure the computing device to determine, based at least in part on the respective quantization offsets for the one or more respective coefficients, respective quantized levels for the respective coefficients.

In another example, this disclosure describes a method comprising determining, based at least in part on whether a video encoder is operating in an all-intra configuration, a random access configuration, or a low-delay configuration, a quantization offset. The method also comprises determining, based at least in part on the quantization offset, respective quantized levels for the coefficients.

In another example, this disclosure describes a computing device comprising one or more processors configured to determine, based at least in part on whether a video encoder is operating in an all-intra configuration, a random access configuration, or a low-delay configuration, a quantization offset. In addition, the one or more processors determine, based at least in part on the quantization offset, respective quantized levels for the coefficients.

In another example, this disclosure describes a computing device comprising means for determining, based at least in part on whether a video encoder is operating in an all-intra configuration, a random access configuration, or a low-delay configuration, a quantization offset. In addition, the computing device comprises means for determining, based at least in part on the quantization offset, respective quantized levels for the coefficients.

In another example, this disclosure describes a computer-readable storage medium that stores instructions that, when executed, configure a computing device to determine, based at least in part on whether a video encoder is operating in an all-intra configuration, a random access configuration, or a low-delay configuration, a quantization offset. In addition, the instructions, when executed, configure the computing device to determine, based at least in part on the quantization offset, respective quantized levels for the coefficients.

The details of one or more examples of the disclosure are set forth in the accompanying drawings and the description below. Other features, objects, and advantages will be apparent from the description, drawings, and claims.

DETAILED DESCRIPTION

A video encoder may quantize coefficients during video encoding. Quantizing the coefficients may reduce the bit depths of the coefficients. In High Efficiency Video Coding (HEVC), the video encoder may perform quantization using a scalar quantization with deadzone technique or using a rate distortion optimized quantization (RDOQ) technique. The RDOQ technique may achieve significant performance gains over the scalar quantization with deadzone technique. However, the RDOQ technique is significantly more complex than the scalar quantization with deadzone technique.

The techniques of this disclosure may reduce the complexity of the RDOQ technique. For example, the RDOQ may involve determining a rate distortion (RD) costs of a quantized level (Level) of a coefficient, Level-1, and 0. Some techniques of this disclosure may reduce the complexity of the RDOQ technique by only determining a RD costs of a quantized level (Level), Level-1, and 0 for a coefficient if the calculated value of the coefficient is less than the product of Level and a quantization step size value. By determining these RD costs only when this condition is satisfied, the complexity of performing the RDOQ technique may be reduced. In another example, some techniques of this disclosure may reduce the complexity of the RDOQ technique, in that a video encoder implementing these techniques may look up quantization offsets in a quantization offset lookup table and use these quantization offsets to quantize coefficients. By looking up the quantization offsets in the quantization offset lookup table, it may be unnecessary to determine the RD costs of Level, Level-1, and 0 for each coefficient. Eliminating the determination of the RD costs of Level, Level-1, and 0 may reduce the complexity of the RDOQ technique. In another example, the complexity of the RDOQ technique may be reduced by generating a multiplication table that the video encoder may use when calculating various RD costs in the RDOQ technique.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words may merely be used to refer to different elements of a same or similar type.

Figure 1:
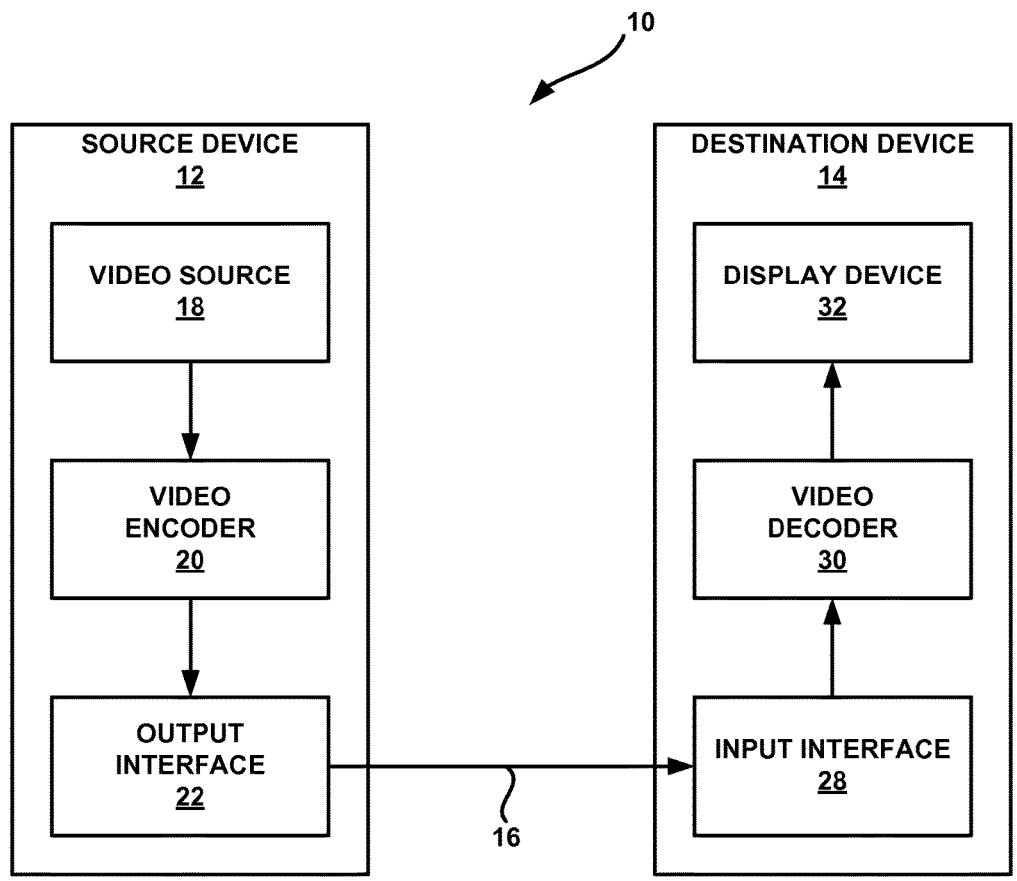
FIG. 1 is a block diagram illustrating an example video coding system that may utilize the techniques described in this disclosure.

FIG. 1 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media and/or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. The encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A draft of the upcoming HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Feb. 21, 2012, is downloadable from http ://phenix.int-evry.fr/jct/doc_end_user/documents/8_San%20Jose/wg11/JCTVC-H1003-v22.zip, the entire content of which is incorporated herein by reference. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Feb. 21, 2013, is downloadable from: http://phenix.int-evry.fr/jct/doc_end_user/documents/11_S hanghai/wg11/JCTVC-K1003 -v8 .zip, the entire content of which is incorporated herein by reference.

Alternatively, video encoder 20 and video decoder 30 may operate according to other proprietary or industry standards, including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The techniques of this disclosure, however, are not limited to any particular coding standard or technique.

Again, FIG. 1 is merely an example and the techniques of this disclosure may apply to video coding settings (e.g., video encoding or video decoding) that do not necessarily include any data communication between encoding and decoding devices. In other examples, data is retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data that represent encoded video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

As mentioned briefly above, video encoder 20 encodes video data. The video data may comprise one or more pictures. Each of the pictures may be a still image. In some instances, a picture may be referred to as a video "frame." Video encoder 20 may generate a bitstream that includes a sequence of bits that form a coded representation of the video data. The coded representation of the video data may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures. A syntax structure may be a set of zero or more syntax elements present together in a bitstream in a specified order.

To generate an encoded representation of a picture, video encoder 20 may partition the picture into a grid of coding tree blocks (CTBs). Thus, each CTB may be associated with a region of the picture. In some instances, a CTB may be referred to as a "tree block", a "largest coding unit" (LCU) or a "coding tree unit." The CTBs of HEVC may be broadly analogous to the macroblocks of previous standards, such as H.264/AVC. However, a CTB is not necessarily limited to a particular size and may include one or more coding units (CUs).

Each of the CTBs may be associated with a block of luminance (luma) samples and two blocks of chrominance (chroma) samples that correspond to pixels in the region associated with the CTB. For ease of explanation, this disclosure may refer to a two-dimensional array of samples as a sample block. Video encoder 20 may use quad-tree partitioning to partition the region associated with a CTB into regions associated with CUs, hence the name "coding tree blocks."

The CTBs of a picture may be grouped into one or more slices. In some examples, each of the slices includes an integer number of CTBs. As part of encoding a picture, video encoder 20 may generate encoded representations of each slice of the picture (i.e., coded slices). To generate a coded slice, video encoder 20 may encode each CTB of the slice to generate encoded representations of each of the CTBs of the slice (i.e., coded CTBs).

To generate a coded CTB, video encoder 20 may recursively perform quad-tree partitioning on the region associated with a CTB to divide the region into progressively-smaller regions. The smaller regions may be associated with CUs. Each of the smaller regions may be associated with a block of luma samples and two blocks of chroma samples. Thus, a CU may be associated with a block of luma samples and two blocks of chroma samples. A partitioned CU may be a CU whose region is partitioned into regions associated with other CUs. A non-partitioned CU may be a CU whose region is not partitioned into regions associated with other CUs.

Video encoder 20 may generate one or more prediction units (PUs) for each non-partitioned CU. Each of the PUs of a CU may be associated with a different region within the region of the CU. Video encoder 20 may generate predictive sample blocks for each PU of the CU.

Video encoder 20 may use intra prediction or inter prediction to generate the predictive sample blocks for a PU. If video encoder 20 uses intra prediction to generate the predictive sample blocks of a PU, video encoder 20 may generate the predictive sample blocks of the PU based on decoded samples of the picture associated with the PU. If video encoder 20 uses inter prediction to generate the predictive sample blocks of the PU, video encoder 20 may generate the predictive sample blocks of the PU based on decoded samples of one or more pictures other than the picture associated with the PU.

Video encoder 20 may generate residual sample blocks for a CU based on predictive sample blocks of the PUs of the CU. The residual sample blocks for the CU may indicate differences between samples in the predictive sample blocks for the PUs of the CU and corresponding samples in the original sample blocks of the CU.

Furthermore, as part of encoding a non-partitioned CU, video encoder 20 may perform recursive quad-tree partitioning on the residual sample blocks of the CU to partition the residual sample blocks of the CU into one or more smaller residual sample blocks associated with transform units (TUs) of the CU. Because the sample blocks of the CU may include a block of luma samples and two blocks of chroma samples, each of the TUs may be associated with a residual sample block of luma samples and two residual sample blocks of chroma samples.

Video coder 20 may apply one or more transforms to the residual sample blocks associated with the TUs to generate coefficient blocks (i.e., blocks of coefficients). Video encoder 20 may perform a quantization process on each of the coefficient blocks. Quantization generally refers to a process in which coefficients are quantized to possibly reduce the amount of data used to represent the coefficients, providing further compression.

Video encoder 20 may apply entropy encoding operations, such as Context-Adaptive Binary Arithmetic Coding (CABAC) operations, to at least some of these syntax elements. In addition to entropy encoding the syntax elements of a coefficient block, video encoder 20 may apply inverse quantization and inverse transforms to the transform block to reconstruct a residual sample block from the transform block. Video encoder 20 may add the reconstructed residual sample block to corresponding samples from one or more predictive sample blocks to produce a reconstructed sample block. By reconstructing sample blocks for each TU of a CU in this way, video encoder 20 may reconstruct the sample blocks of the CU.

After video encoder 20 reconstructs the sample blocks of the CU, video encoder 20 may perform a deblocking operation to reduce blocking artifacts associated with the CU. After performing these operations, video encoder 20 may store the reconstructed sample blocks of the CU in a decoded picture buffer for use in generating predictive sample blocks for PUs of other CUs.

Video decoder 30 may receive a bitstream. The bitstream may include a coded representation of video data encoded by video encoder 20. Video decoder 30 may parse the bitstream to extract syntax elements from the bitstream. As part of extracting at least some syntax elements from the bitstream, video decoder 30 may entropy decode data in the bitstream.

Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements. For instance, video decoder 30 may generate, based on syntax elements associated with a CU, predictive sample blocks for PUs of the CU. In addition, video decoder 30 may inverse quantize coefficient blocks associated with TUs of the CU. Video decoder 30 may perform inverse transforms on the coefficient blocks to reconstruct residual sample blocks associated with the TUs of the CU. Video decoder 30 may reconstruct the sample blocks of a CU based on the predictive sample blocks and the residual sample blocks.

As discussed above, video encoder 20 may generate residual sample blocks. Each sample in a residual sample block may indicate a difference between corresponding samples in an original version of a sample block and a predictive version of the same sample block. After generating a residual sample block, video encoder 20 may apply one or more transforms to the residual sample block. By applying the one or more transforms to the residual sample block, video encoder 20 may convert the residual sample block from a sample domain to a frequency domain. The result is a block of transform coefficients (i.e., a "transform coefficient block" or a "coefficient block"). In some examples, the purpose of transformation is to decorrelate the signal into different frequency components. Furthermore, in some examples, video encoder 20 does not apply a transform to a residual sample block. In such examples, video encoder 20 may treat the residual sample block in the same way as a coefficient block. For ease of explanation, discussion in this disclosure of coefficient blocks may apply to residual sample blocks to which video encoder 20 does not apply the one or more transforms.

Furthermore, as discussed above, after generating a coefficient block, video encoder 20 may quantize the coefficients of the coefficient block. Quantizing the coefficients may reduce the bit depths of the coefficients. Quantization is the process that may introduce distortion in encoding. After that the quantized coefficients are encoded using variable length coding, such as CABAC. In HEVC, there are two techniques for quantization. The first quantization technique is scalar quantization with deadzone. The second quantization technique is rate distortion optimized quantization (RDOQ).

In the scalar quantization with deadzone technique, video encoder 20 maps a coefficient to a discrete quantized level using equation (1), below:

$$z = \left\lfloor \frac{|w| + f}{\Delta} \right\rfloor \cdot \text{sign}(W) \quad (1)$$

In equation (1), $\lfloor \cdot \rfloor$ denotes rounding to the nearest integer towards minus infinity and sign( ) is a function that returns the sign of the input signal, W. $\Delta$ is a quantization step and f is the quantization offset. In equation (1), the quantization offset f controls the size of the deadzone. The deadzone is the interval that maps to 0. The quantization offset f also shifts the reconstruction level away from the center of the interval that maps to 0. z indicates the quantized level value.

During decoding, video decoder 30 may inverse quantize the transform coefficient using equation (2), below:

$$W' = \Delta \cdot Z \quad (2)$$

In equation (2), W' denotes a de-quantized coefficient, $\Delta$ is a quantization step, and Z is the received quantized level.

The RDOQ technique attempts to optimize the trade-offs between rate (i.e., the bit rate of encoded video data) and distortion. In general, video encoder 20 may perform the RDOQ technique by performing the following steps. First, video encoder 20 may initialize a context: C1=1, C2=0. Second, video encoder 20 may scan through the coefficients of the coefficient block in a reverse diagonal scan order. As video encoder 20 scans each coefficient, video encoder 20 may use a quantization offset of ½ to quantize the coefficient. Third, video encoder 20 may determine optimal levels for coefficients in the coefficient block. Fourth, video encoder 20 may determine the optimal last significant coefficient.

To determine the optimal levels for the coefficients in the third step of the previous paragraph, video encoder 20 may perform the following steps. First, video encoder 20 may determine the last significant coefficient. When scanning the coefficients in a reverse diagonal scan order, the last significant coefficient is the first encountered coefficient that is quantized to a non-zero level. Second, for each remaining non-zero coefficient, video encoder 20 may choose an optimal level based on rate-distortion (RD) costs of the quantized levels for the coefficient. The remaining coefficients are coefficients that occur after the last significant coefficient according to the reverse diagonal scan order.

To choose the optimal quantized level for a coefficient (i.e., the current coefficient), video encoder 20 may determine if the quantized level for the current coefficient is less than 3. If the quantized level for the current coefficient is less than 3, video encoder 20 may calculate the RD cost that would result from replacing the current coefficient with the value Level, where Level denotes the quantized level for the current coefficient calculated above. Furthermore, if the quantized level for the current coefficient is less than 3, video encoder 20 may calculate the RD cost that would result from replacing the current coefficient with Level-1. In addition, if the quantized level for the current coefficient is less than 3, video encoder 20 may calculate the RD cost that would result from replacing the current coefficient with the value 0.

If the quantized level for the current coefficient is greater than or equal to 3, video encoder 20 may calculate the RD cost that would result from replacing the current coefficient with the value Level. Furthermore, if the quantized level for the current coefficient is greater than or equal to 3, video encoder 20 may calculate the RD cost that would result from replacing the current coefficient with the value Level-1.

Furthermore, when video encoder 20 chooses the optimal quantized level for the current coefficient, video encoder 20 may update the RD cost of quantizing all coefficients of the coefficient block to 0 (resulting in an un-coded block). Video encoder 20 also updates the RD cost of encoding each coefficient of the coefficient block. In addition, video encoder 20 updates the cost of encoding the significance map of the coefficient block. The significance map of the coefficient block indicates which coefficients of the coefficient block are non-zero.

In addition, video encoder 20 updates the context based on the optimized quantized ($L_{opt}$) of the current coefficient. Video encoder 20 may determine $L_{opt}$ as the quantized level for the current coefficient (i.e., Level, Level-1, or 0) that has a lowest RD cost. Video encoder 20 may use the context to perform the level decision of the next coefficient. For instance, video encoder 20 may determine, based at least in part on the context, various RD costs associated with the next coefficient.

As indicated above, video encoder 20 may determine the optimal last significant coefficient as part of performing the RDOQ technique. To determine the optimal last significant coefficient, video encoder 20 may perform the following steps. First, video encoder 20 may initialize a value (d64BestCost) to be equal to the RD cost if the current block is un-coded. Second, video encoder 20 may scan through the coefficients of the coefficient block according to a reverse diagonal scan until video encoder 20 encounters coefficient whose quantized level is greater than 1.

When video encoder 20 scans a coefficient (i.e., the current coefficient), video encoder 20 performs the following steps. First, video encoder 20 may calculate a total block cost (totalCost) that would result if the current coefficient is considered to be the last significant coefficient. Second, if totalCost is less than d64BestCost, video encoder 20 may set a best last position indicator (iBestLastIdxP1) such that iBestLastIdxP1 indicates the position within the coefficient block of the current coefficient and may set d64BestCost equal to totalCost.

In the RDOQ technique described above, video encoder 20 calculates several RD costs. Video encoder 20 may calculate a RD cost as $D+\lambda*R$. D denotes the mean square error between the original coefficients of the coefficient block and the reconstructed coefficients of the coefficient block. R denotes the entropy of the corresponding context model. Video encoder 20 may estimate R before performing RDOQ for a coefficient block or before performing RDOQ for any coefficient block of a TU, the basic unit of transform and quantization in HEVC. That is, the rate R of the symbol may be estimated every time before RDOQ (or for every TU) as the entropy of the corresponding context model.

In order to estimate the rate R (i.e., the rate to encode the quantized level and related information such as significance map and position of the last significant coefficient etc.) for every TU, video encoder 20 may calculate the entropies of the CABAC context models. In theory, CABAC can approximate the limit of compression. That is, the average codeword length generated by CABAC may, in theory, approximate the entropy of the source. When video encoder 20 uses CABAC to encode a data symbol, the data symbol is first binarized. The binarized data symbol may be referred to as a "bin."

Video encoder 20 may then select a context model. The context model may define the statistics of recently coded data symbols. For example, in case of encoding the quantized level of 1, the context model may be defined as the number of previous coefficients that have been quantized to 1. In this way, a context model may define a conditional probability for the current symbol. That is, the context model may indicate the probability of the current symbol, given the previously-coded symbols. Furthermore, the context model may define the probability of a bin being "1" or "0." When video encoder 20 performs CABAC, video encoder 20 may encode the binarized data symbol (i.e., the bin) according to the selected context model (i.e., "probability model").

After encoding the binarized data symbol, video encoder 20 updates the selected context model based at least in part on the actual coded value. As long as CABAC encoding is ongoing, video encoder 20 may continue updating the context model. Before video encoder 20 performs RDOQ, video encoder 20 may load the current probability (i.e., context) model of every context and video encoder 20 may calculate the corresponding entropy. Video encoder 20 may use the entropy to estimate the number of bits to encode the symbol for the corresponding context. In other words, video encoder 20 may use the entropy of a context to estimate how many bits would be in an encoded version of the symbol if the context were used to encode the symbol. Estimating the number of bits to encode the symbol may be referred herein to as "bit estimation."

Thus, when video encoder 20 performs the RDOQ technique described above, video encoder 20 may perform the following steps:

1. Initialize context: C1=1, C2=0.
2. Quantize the coefficients with an offset of ½ in reverse diagonal scan order;
3. Decision of the optimal level.
   I. Fix last significant coefficient: the first coefficient that is quantized to non-zero in reverse diagonal scan.
   II. For the remaining non-zero coefficients in the reverse diagonal scan, choose optimal level based on RD cost.
      a. Choose the best level $L_{opt}$.
         i. If Level<3, calculate the RD cost ($D+\lambda \cdot R_{Level}$) of Level, Level-1 and 0.
         ii. If Level>=3, calculate the RD cost ($D+\lambda \cdot R_{Level}$) of Level, Level-1.
      b. Update encoding cost.
         i. Cost of quantized to 0 (for uncoded block).
         ii. Cost of encoding each coefficient.
         iii. Cost of encoding significance map ($\lambda \cdot R_{sig\_map}$).
      c. Update context based on the decided level $L_{opt}$. The context may be used by the level decision of the next coefficient.
   III. Process the next coefficient, and go to step II.
4. Decision of the optimal last significant coefficient.
   1) Initialize d64BestCost to be the RD cost if the current block is uncoded.
   2) In reverse diagonal scan, calculate the total block cost totalCost if the current coefficient is the last significant coefficient. That is, $\lambda \cdot R_{positionX}+\lambda \cdot R_{positionY}$ need to be added and corresponding costs with significance map should be adjusted.
   3) If totalCost<d64BestCost, new best last position (iBestLastIdxP1) is current position, d64BestCost=totalCost.
   4) Iterate until LevelofCurCoeff>1.

Compared with the scalar quantization with deadzone technique, the RDOQ technical may achieve significant performance gains. However, these gains come at the expense of significantly increased complexity for video encoder 20. Tables 1-4, below illustrate HEVC performance RDOQ off (i.e., scalar quantization with deadzone) versus RDOQ. As shown in Tables 1-4, compared with scalar quantization with deadzone, RDOQ can achieve a performance gain from 3.4% to 5.7%.

TABLE 1

| All Intra HE | | | |
|---|---|---|---|
| | Y | U | V |
| Class A | 5.6% | −0.8% | −2.4% |
| Class B | 6.9% | 0.5% | 0.5% |
| Class C | 5.3% | −0.4% | 0.5% |
| Class D | 5.1% | −1.8% | −0.8% |
| Class E | 5.1% | 0.3% | 0.9% |
| Overall | 5.7% | −0.4% | −0.3% |
| | 5.7% | −0.2% | 0.0% |
| Enc Time [%] | | 85% | |
| Dec Time [%] | | 118% | |

TABLE 2

| Low delay B HE | | | |
|---|---|---|---|
| | Y | U | V |
| Class A | | | |
| Class B | 4.3% | 5.8% | 5.2% |
| Class C | 3.7% | 5.7% | 5.7% |
| Class D | 3.7% | 6.3% | 6.0% |
| Class E | 1.8% | 3.4% | 2.1% |
| Overall | 3.5% | 5.5% | 4.9% |
| | 3.5% | 5.4% | 4.9% |
| Enc Time [%] | | 92% | |
| Dec Time [%] | | 81% | |

TABLE 3

| Random Access HE | | | |
|---|---|---|---|
| | Y | U | V |
| Class A | 5.3% | 4.7% | 5.1% |
| Class B | 5.6% | 6.9% | 6.3% |
| Class C | 5.3% | 7.7% | 7.7% |
| Class D | 5.1% | 5.7% | 6.0% |
| Class E | | | |
| Overall | 5.3% | 6.3% | 6.3% |
| | 5.6% | 6.4% | 6.4% |
| Enc Time [%] | | 91% | |
| Dec Time [%] | | 104% | |

TABLE 4

| Low Delay P HE | | | |
|---|---|---|---|
| | Y | U | V |
| Class A | | | |
| Class B | 3.9% | 5.3% | 4.8% |
| Class C | 3.7% | 6.0% | 6.0% |
| Class D | 3.9% | 6.4% | 6.2% |
| Class E | 1.5% | 3.7% | 1.5% |
| Overall | 3.4% | 5.5% | 4.8% |
| | 3.2% | 5.3% | 4.8% |
| Enc Time [%] | | 88% | |
| Dec Time [%] | | 83% | |

The techniques of this disclosure may simplify the step in RDOQ of choosing an optimal quantized level for a coefficient (step (3) in the description above). From the description of RDOQ above, the third step (i.e., the decision of the optimal level), RD cost of multiple levels may be calculated in order to choose the optimal level. That is, video encoder 20 may choose the optimal level from Level, Level-1 or 0 based on the RD cost in the third step of RDOQ.

In accordance with the techniques of this disclosure, video encoder 20 may calculate, for each coefficient of a coefficient block, the RD costs of using Level, Level-1, and 0 as the quantized levels for a coefficient, only if the value of the coefficient is less than the reconstructed value of the coefficient. The reconstructed value of the coefficient is equal to the quantized level for the coefficient (Level) multiplied by the step size used in generating the quantized level for the coefficient. In other words, if video encoder 20 determines that the value of the coefficient is greater than or equal to the reconstructed value of the coefficient, video encoder 20 does not calculate RD costs for Level, Level-1, and 0, but may instead simply select Level as the quantized level for the coefficient, which may simplify the selection of an optimal quantized level for the coefficient. In other words, video encoder 20 may determine, without determining rate-distortion costs for quantizing the coefficient to be Level, Level-1, or 0 and in response to determining that the coefficient is not less than the product of the initial quantized level (i.e., Level) and the quantization step size value, that the actual quantized level for the coefficient is the initial quantized level for the coefficient.

Calculating the RD costs of using Level, Level-1, and 0 as the quantized levels for the coefficient only if the value of the coefficient is less than the reconstructed value of the coefficient may reduce the number of multiplication operations that the video encoder performs. At the same time, the bitrate does not increase excessively.

Thus, in accordance with the techniques of this disclosure, video encoder 20 may perform the RDOQ technique of this disclosure by performing the following steps. First, video encoder 20 may initialize a context: C1=1, C2=0. Second, video encoder 20 may scan through the coefficients of the coefficient block in a reverse diagonal scan order. As video encoder 20 scans each coefficient, video encoder 20 may quantize the coefficient with an offset of ½. Third, video encoder 20 may determine optimal levels for coefficients in the coefficient block. Fourth, video encoder 20 may determine the optimal last significant coefficient. Video encoder 20 may perform the first, second, and fourth steps of the RDOQ technique as described above.

However, to determine the optimal levels for the coefficients in the third step, video encoder 20 may perform the following steps. First, video encoder 20 may determine the last significant coefficient. When scanning the coefficients in a reverse diagonal scan order (that is, generally proceeding from highest-frequency coefficients to lowest-frequency coefficients), the last significant coefficient is the first encountered coefficient that is quantized to a non-zero level. Second, for each remaining non-zero coefficient, video encoder 20 may choose an optimal level based on RD costs of the quantized levels for the coefficient. The remaining coefficients are coefficients that occur after the last significant coefficient according to the reverse diagonal scan order.

To choose the optimal quantized level for a coefficient (i.e., the current coefficient), in accordance with the techniques of this disclosure, video encoder 20 may perform the following steps. First, video encoder 20 may determine whether the value of the current coefficient is less than Level*StepSize, where Level is the quantized level for the current coefficient determined in step (2) and StepSize is the size of the quantization step Δ used to quantize the current coefficient. In other words, video encoder 20 may determine whether the value of the current coefficient is less than the reconstructed value of the current coefficient. If the value of the current coefficient is less than the reconstructed value of the current coefficient, video encoder 20 may determine whether the quantized level for the current coefficient is less than 3.

In response to determining that the current coefficient is less than 3, video encoder 20 may calculate the RD cost that would result from replacing the current coefficient with the value Level, where Level denotes the quantized level for the current coefficient. Furthermore, in response to determining that the current coefficient is less than 3, video encoder 20 may calculate the RD cost that would result from replacing the current coefficient with Level-1. In response to determining that the current coefficient is less than 3, video encoder 20 may also determine the RD cost that would result from replacing the current coefficient with the value 0.

In response to determining that the quantized level for the current coefficient is greater than or equal to 3, video encoder 20 may calculate the RD cost that would result from replacing the current coefficient with the value Level. Furthermore, video encoder 20 may calculate the RD cost that would result from replacing the current coefficient with the value Level-1.

Video encoder 20 may select the optimal quantized level $L_{opt}$ of the current coefficient as the version having the lowest RD cost. Furthermore, video encoder 20 may update the RD costs used in determining the optimal last significant coefficient. That is, video encoder 20 may update the RD cost of quantizing all coefficients of the coefficient block to 0 (resulting in an un-coded block). In addition, video encoder 20 may update the cost of encoding each coefficient of the coefficient block. Video encoder 20 may also update the cost of encoding the significance map of the coefficient block. Video encoder 20 may update the context based on the determined optimal quantized level for the current coefficient ($L_{opt}$). Video encoder 20 may use the context in the level decision of the next coefficient in the coefficient block.

In this way, video encoder 20 may determine an initial quantized level for a coefficient of a coefficient block. In addition, video encoder 20 may determine whether the coefficient is less than the product of the initial quantized level and a quantization step size value. In response to determining that the transform coefficient is less than the product of the initial quantized level and the quantization step size value, video encoder 20 may determine rate-distortion costs of quantizing the coefficient to be the initial quantized level and the initial quantized level minus one. Furthermore, in response to determining that the transform coefficient is less than the product of the initial quantized level and the quantization step size value, video encoder 20 may determine an actual quantized level for the coefficient based on the calculated rate-distortion costs. In addition, video encoder 20 may include the actual quantized level in a quantized version of the coefficient block.

As described above, the RDOQ algorithm has two main passes. The first pass is to choose the optimal quantized level from among Level, Level-1, and 0, based on the RD cost of the individual coefficient. For a fixed quantization step, video encoder 20 may always choose a quantization offset so that the quantized level is equal to the level determined by the RDOQ algorithm. The second pass is to select the optimal last significant coefficient based on the RD cost of the block. Additional techniques of this disclosure may simplify the RDOQ algorithm by replacing the first step of the RDOQ algorithm. That is, the additional techniques of this disclosure may simplify the step in RDOQ of choosing an optimal quantized level for a coefficient. In particular, if the quantization offset is adjusted so that the quantized level is equal to the optimal level determined in the first pass of RDOQ, then the complexities involved in the level decision of the first pass may be removed.

To determine quantization offsets that can approximate the performance of RDOQ, the number of times Level, Level-1 or 0 are selected in steps 3 and 4 (in last significant coefficient decision, some levels are set to 0) of RDOQ can be collected for each frequency coefficient. In this way, the rank of Level, Level-1 or 0 being selected may be obtained for each coefficient at each different frequency. If the quantization offsets are limited to ½, ⅓, and ⅙, video encoder 20 may select a quantization offset as shown in Table 5, below. Table 5, below, illustrates an example decision of quantization offset based on the rank of the number of times Level, Level-1, or 0 get selected in RDOQ. In some examples, Table 5 is generated based on test video data. In other examples, Table 5 is generated dynamically by video encoder 20.

TABLE 5

| Rank #1 | Quantization offset |
| --- | --- |
| Level | ½ |
| Level-1 | ⅓ |
| 0 | ⅙ |

For example, if Level is selected most frequently for a coefficient at position (I,J) of a coefficient block, the quantization offset ½ may be set for the position (I,J). Otherwise if Level-1 or 0 is selected most frequently in RDOQ, then quantization offset may be set to ⅓ or ⅙. In this way, a near optimal quantization offset table can be generated.

Thus, in accordance with the additional techniques of this disclosure, a lookup table is generated. In some examples, video encoder 20 generates the lookup table. The lookup table may map transform coefficient positions to quantization offsets. The lookup table may be generated based on rates at which the conventional RDOQ technique uses the quantization offsets for coefficients at various positions within coefficient blocks. Example quantization offsets may include ½, ⅓, and ⅙. That is, the lookup table may map a coefficient position to one of three possible quantization offset values: ½, ⅓, and ⅙. Video encoder 20 may use respective positions of respective coefficients in a coefficient block to look up, in the lookup table, respective quantization offsets for the respective coefficients. Furthermore, video encoder 20 may determine, based at least in part on the respective quantization offsets for the one or more respective coefficients, respective quantized levels for the respective coefficients.

After video encoder 20 uses the lookup table to look up a quantization offset for a coefficient (i.e., the current coefficient), video encoder 20 may use equation (1), reproduced again below, to determine the optimized quantized level ($L_{opt}$) for the current coefficient.

$$z = \left\lfloor \frac{|W| + f}{\Delta} \right\rfloor \cdot \text{sign}(W) \qquad (1)$$

In other words, after determining whether to use value Level, Level-1, or 0, video encoder 20 may select a value for f in equation (1) above according to a table similar to Table 5. In this manner, video encoder 20 may calculate a quantized level for the current coefficient (i.e., the value of z calculated according to function (1)). Video encoder 20 may use the quantized level for the current coefficient in the quantized coefficient block.

In the RDOQ technique, video encoder 20 computes the RD cost. Computing the RD cost may involve a number of double point additions and multiplications. Double point addition and multiplication are operations that involve the addition and multiplication of numbers that involve the double-precision type of data (e.g., a floating point number). Double point multiplication may take more computing time than other types of computing operations. Consequently, the major computations for the RDOQ technique for each coefficient may occur in the third step (i.e., the decision of the optimal level for the coefficient). The double point multiplications in the third step of the RDOQ technique include:

Two double point multiplications for reconstruction error D. D=dError*dError*dTemp, where dError is the difference of the original coefficient and the reconstructed coefficient and dTemp is a scaling factor.

One double point multiplication for $\lambda \cdot R_{level}$, where $R_{level}$ is the number of bits estimated to encode a quantized level.

One double point multiplication for $\lambda \cdot R_{sig\_map}$, where $R_{sig\_map}$ is the number of bits estimated to encode the significance map for the current coefficient.

Two double point multiplications for distortion induced if the current coefficient is quantized to 0.

Furthermore, the major computations in the fourth step of the RDOQ technique (i.e., the decision of the optimal last significant coefficient) include two double point multiplications for $\lambda \cdot R_{positionX} \lambda \cdot R_{positionY}$, where $R_{positionX}$ and $R_{positionY}$ are the number of bits estimated to encode the position of the last significant coefficient. Although $\lambda$ is a constant number, video encoder 20 may have to calculate $\lambda \cdot R$ as R is estimated as the entropy of the updating context model.

Temporally neighboring pictures are typically highly correlated. That is, neighboring pictures are likely to be similar to one another. Hence, in accordance with one or more techniques of this disclosure, video encoder 20 may use the entropies of the context models of the previous frame as the bit estimation for the symbols in the current frame. In this way, it may be unnecessary for video encoder 20 to load the entropies of the context models each time video encoder 20 performs RDOQ. Similarly, it may be unnecessary for video encoder 20 to load the entropies of the context models for every TU. Rather, video encoder 20 may load the entropies of the context model each time video encoder 20 starts encoding a new frame. In other words, video encoder 20 may perform bit estimation once per frame. In other words, video encoder 20 may estimate number of bits for the symbols in the current frame once per frame.

Because $\lambda$ is a constant number, video encoder 20 may avoid the double point multiplications by constructing a multiplication table at the beginning of encoding each new frame. The multiplication table may be a lookup table. Video encoder 20 may use the context as an index to lookup a value of $\lambda \cdot R$ in the multiplication table. During RD cost calculation in RDOQ, video encoder 20 may look up the RD cost in the multiplication table. The bit estimation in RD cost may not be as accurate because there may be mismatches between the current context models and the context models of the previous frame. However, due to the fact that temporally neighboring video frames are highly correlated, the performance loss brought by the mismatch may be relatively small.

Figure 2:
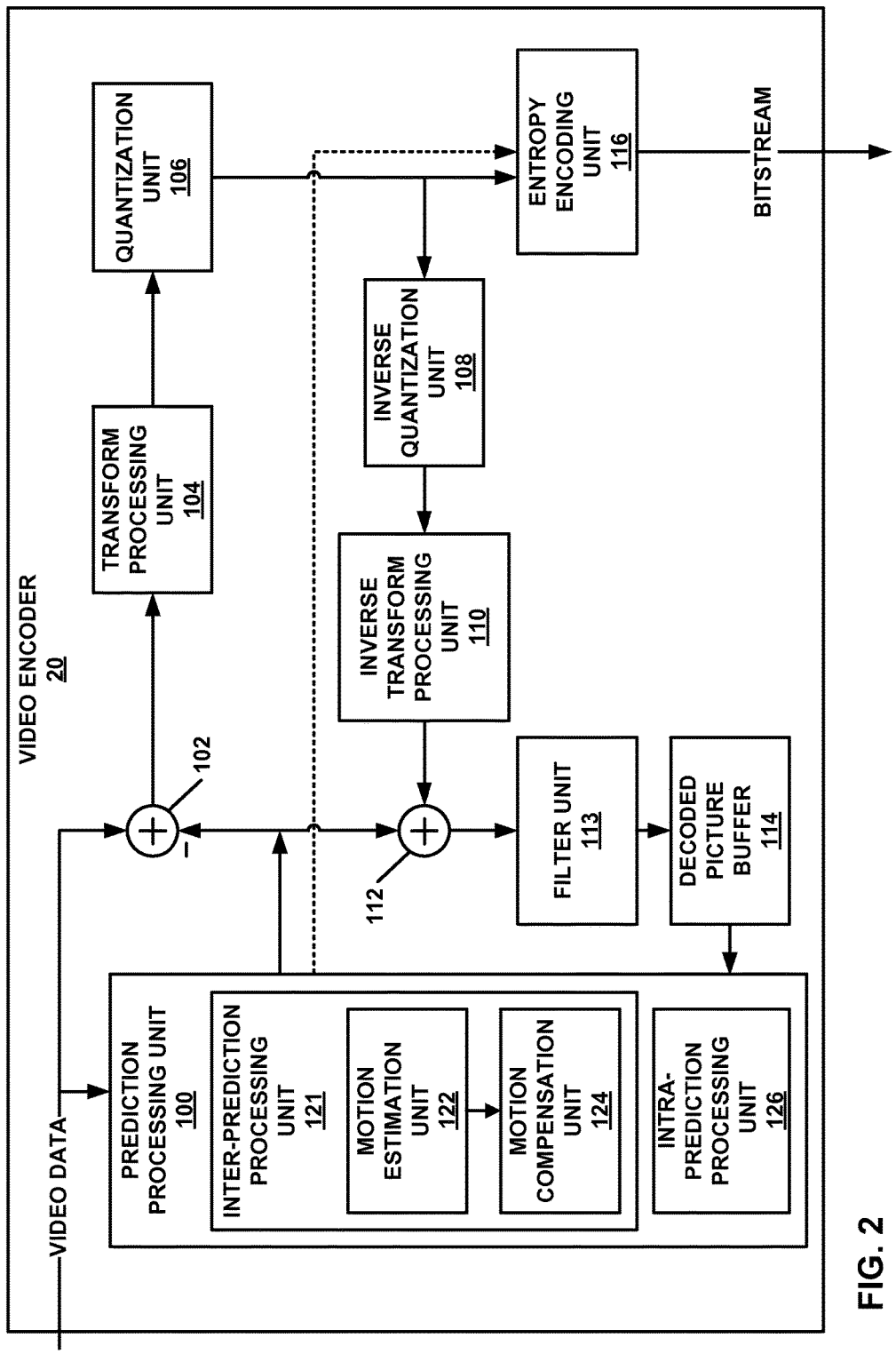
FIG. 2 is a block diagram illustrating an example video encoder that may implement the techniques described in this disclosure.

FIG. 2 is a block diagram illustrating an example video encoder that may implement the techniques described in this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 204, a quantization unit 106, an inverse quantization unit 108, an inverse transform processing unit 110, a reconstruction unit 112, a filter unit 113, a decoded picture buffer 114, and an entropy encoding unit 116. Entropy encoding unit 116 includes a regular CABAC coding engine 118 and a bypass coding engine 120. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components.

Video encoder 20 receives video data. As part of encoding a picture, video encoder 20 may encode each coding tree block (CTB) in a slice. As part of encoding a CTB, prediction processing unit 100 may perform quad-tree partitioning on the region associated with the CTB to divide the region into progressively-smaller regions. The smaller regions may be associated with CUs. For example, prediction processing unit 100 may partition the region of a CTB into four equally-sized sub-regions, partition one or more of the sub-regions into four equally-sized sub-sub-regions, and so on.

Video encoder 20 may encode CUs of a CTB in a picture to generate encoded representations of the CUs (i.e., coded CUs). Video encoder 20 may encode the CUs of a CTB according to a z-scan order. In other words, video encoder 20 may encode a top-left CU, a top-right CU, a bottom-left CU, and then a bottom-right CU, in that order. When video encoder 20 encodes a partitioned CU, video encoder 20 may encode CUs associated with sub-blocks of the sample blocks of the partitioned CU according to the z-scan order.

Furthermore, as part of encoding a CU, prediction processing unit 100 may partition the sample blocks of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 121 may generate predictive data for a PU by performing inter prediction on each PU of a CU. The predictive data for the PU may include predictive sample blocks that correspond to the PU and motion information for the PU. Slices may be I slices, P slices, or B slices. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU.

If a PU is in a P slice, motion estimation unit 122 may search the reference pictures in a list of reference pictures (e.g., "list 0") for a reference block for the PU. Data for the reference pictures may be stored in decoded picture buffer 114. The reference block of the PU may be a sample block that most closely corresponds to a sample block of the PU. Motion estimation unit 122 may generate a reference picture index that indicates the reference picture in list 0 containing the reference block of the PU and a motion vector that indicates a spatial displacement between a sample block of the PU and the reference block. Motion estimation unit 122 may output the reference picture index and the motion vector as the motion information of the PU. Motion compensation unit 124 may generate the predictive sample blocks of the PU based at least in part on the reference block indicated by the motion information of the PU.

If a PU is in a B slice, motion estimation unit 122 may perform uni-directional inter prediction or bi-directional inter prediction for the PU. To perform uni-directional inter prediction for the PU, motion estimation unit 122 may search the reference pictures of a first reference picture list ("list 0") or a second reference picture list ("list 1") for a reference block for the PU. Motion estimation unit 122 may output, as the motion information of the PU, a reference picture index that indicates a position in list 0 or list 1 of the reference picture that contains the reference block, a motion vector that indicates a spatial displacement between a sample block of the PU and the reference block, and a prediction direction indicator that indicates whether the reference picture is in list 0 or list 1.

To perform bi-directional inter prediction for a PU, motion estimation unit 122 may search the reference pictures in list 0 for a reference block for the PU and may also search the reference pictures in list 1 for another reference block for the PU. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the sample blocks of the PU. The motion information of the PU may include the reference picture indexes and the motion vectors of the PU. Motion compensation unit 124 may generate the predictive sample blocks of the PU based on the reference blocks indicated by the motion information of the PU.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTBs. Intra-prediction processing unit 126 may use various numbers of intra prediction modes, e.g., 33 directional intra prediction modes. In some examples, the number of intra prediction modes may depend on the size of the sample blocks of the PU.

Prediction processing unit 100 may select the predictive data for PUs of a CU from among the predictive data generated by inter-prediction processing unit 121 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based at least in part on the sample blocks of a CU and the selected predictive sample blocks of the PUs of the CU, residual sample blocks of a CU. For instance, residual generation unit 102 may generate the residual sample blocks of the CU such that each sample in the residual sample blocks has a value equal to a difference between a sample in a sample block of the CU and a corresponding sample in a selected predictive sample block of a PU of the CU.

Prediction processing unit 100 may perform quad-tree partitioning to partition the residual sample blocks of a CU into sub-blocks. Each undivided residual sample block may be associated with TUs of the CU. The sizes and positions of the residual sample blocks associated with TUs of a CU may or may not be based on the sizes and positions of sample blocks of the PUs of the CU.

Because the CU is associated with one block of luma samples and two blocks of chroma samples, each of the TUs may be associated with a block of luma samples and two blocks of chroma samples. Transform processing unit 104 may generate coefficient blocks for each TU of a CU by applying one or more transforms to the residual sample blocks associated with the TU. Transform processing unit 104 may apply various transforms to a residual sample block associated with a TU. For example, transform processing unit 104 may apply a discrete cosine transform (DCT), a directional transform, or a conceptually-similar transform to a residual sample block.

Quantization unit 106 may quantize the coefficients in a coefficient block. The quantization process may reduce the bit depth associated with some or all of the coefficients. For example, an n-bit coefficient may be rounded down to an m-bit coefficient during quantization, where n is greater than m. Quantization unit 106 may quantize a coefficient block associated with a TU of a CU based at least in part on a quantization parameter (QP) value associated with the CU. Video encoder 20 may adjust the degree of quantization applied to the coefficient blocks associated with a CU by adjusting the QP value associated with the CU. In accordance with the techniques of this disclosure, quantization unit 106 may be configured to select a quantized level value for a coefficient using a look-up table and/or according to a modified RDOQ process, as explained above with respect to FIG. 1.

Inverse quantization unit 108 and inverse transform processing unit 110 may apply inverse quantization and inverse transforms to a coefficient block, respectively, to reconstruct a residual sample block from the coefficient block. Reconstruction unit 112 may add samples of the reconstructed residual sample block to corresponding samples from one or more predictive sample blocks generated by prediction processing unit 100 to produce a reconstructed sample block associated with a TU. By reconstructing sample blocks for each TU of a CU in this way, video encoder 20 may reconstruct the sample blocks of the CU.

Filter unit 113 may perform a deblocking operation to reduce blocking artifacts in the sample blocks associated with a CU. Decoded picture buffer 114 may store the reconstructed sample blocks. Inter-prediction unit 121 may use a reference picture that contains the reconstructed sample blocks to perform inter prediction on PUs of other pictures. In addition, intra-prediction processing unit 126 may use reconstructed sample blocks in decoded picture buffer 114 to perform intra prediction on other PUs in the same picture as the CU.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, entropy encoding unit 116 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Video encoder 20 may output a bitstream that includes entropy-encoded data generated by entropy encoding unit 116.

Figure 3:
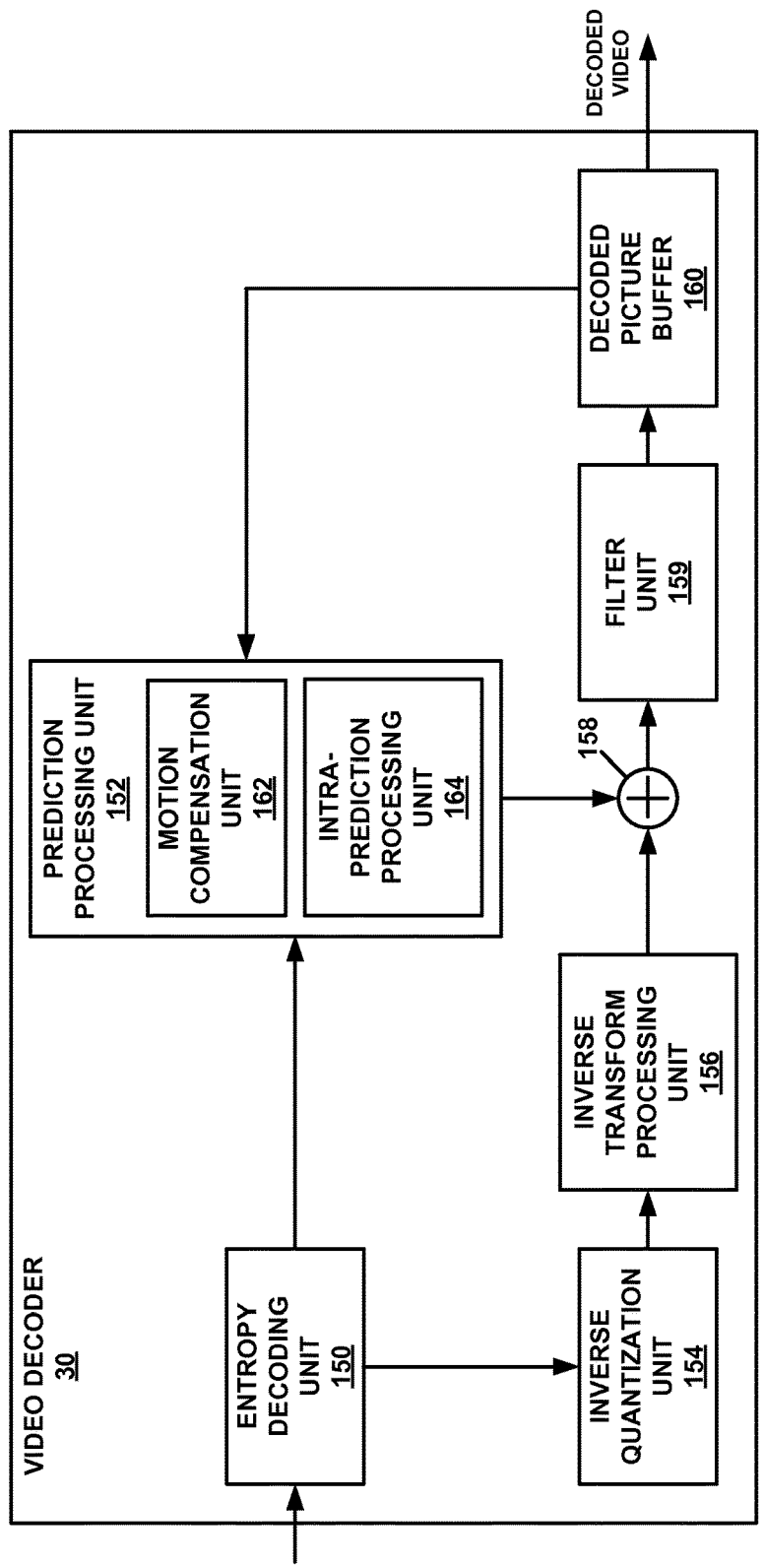
FIG. 3 is a block diagram illustrating an example video decoder that may implement the techniques described in this disclosure.

FIG. 3 is a block diagram illustrating an example video decoder 30 that may implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. Entropy decoding unit 150 includes a regular CABAC coding engine 166 and a bypass coding engine 168. In other examples, video decoder 30 may include more, fewer, or different functional components.

Video decoder 30 may receive a bitstream. Entropy decoding unit 150 may parse the bitstream to extract syntax elements from the bitstream. In addition, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream.

In addition, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual sample blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. Inverse quantization unit 154 may inverse quantize a coefficient according to a conventional inverse quantization process, and need not utilize the RDOQ process or a look-up table to determine inverse quantized values for coefficients. In this manner, the techniques of this disclosure may be used to produce a standard-compliant bitstream that video decoder 30 can decode without modification.

After inverse quantization unit 154 inverse quantizes a coefficient block, inverse transform processing unit 156 may apply one or more inverse transforms to the coefficient block in order to generate a residual sample block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 164 may perform intra prediction to generate a predictive sample block for the PU. Intra-prediction processing unit 164 may use an intra prediction mode to generate the predictive sample blocks for the PU based on the sample blocks of spatially-neighboring PUs. Intra-prediction processing unit 164 may determine the intra prediction mode for the PU based on one or more syntax elements parsed from the bitstream.

Motion compensation unit 162 may construct a first reference picture list (list 0) and a second reference picture list (list 1) based at least in part on syntax elements extracted from the bitstream. Furthermore, if a PU is encoded using inter prediction, entropy decoding unit 150 may extract motion information for the PU. Motion compensation unit 162 may determine, based on the motion information of the PU, one or more reference blocks for the PU. Motion compensation unit 162 may generate, based at least in part on the one or more reference blocks for the PU, predictive sample blocks for the PU.

Reconstruction unit 158 may use the residual sample blocks associated with TUs of a CU and the predictive sample blocks of the PUs of the CU, i.e., either intra-prediction data or inter-prediction data, as applicable, to reconstruct the sample blocks of the CU. In particular, reconstruction unit 158 may add samples of the residual sample blocks to corresponding samples of the predictive sample blocks to reconstruct the sample blocks of the CU.

Filter unit 159 may perform a deblocking operation to reduce blocking artifacts associated with the sample blocks of the CUs of a CTB. Video decoder 30 may store the sample blocks of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based at least in part on the sample blocks in decoded picture buffer 160, intra prediction or inter prediction operations on PUs of other CUs.

Figure 4:
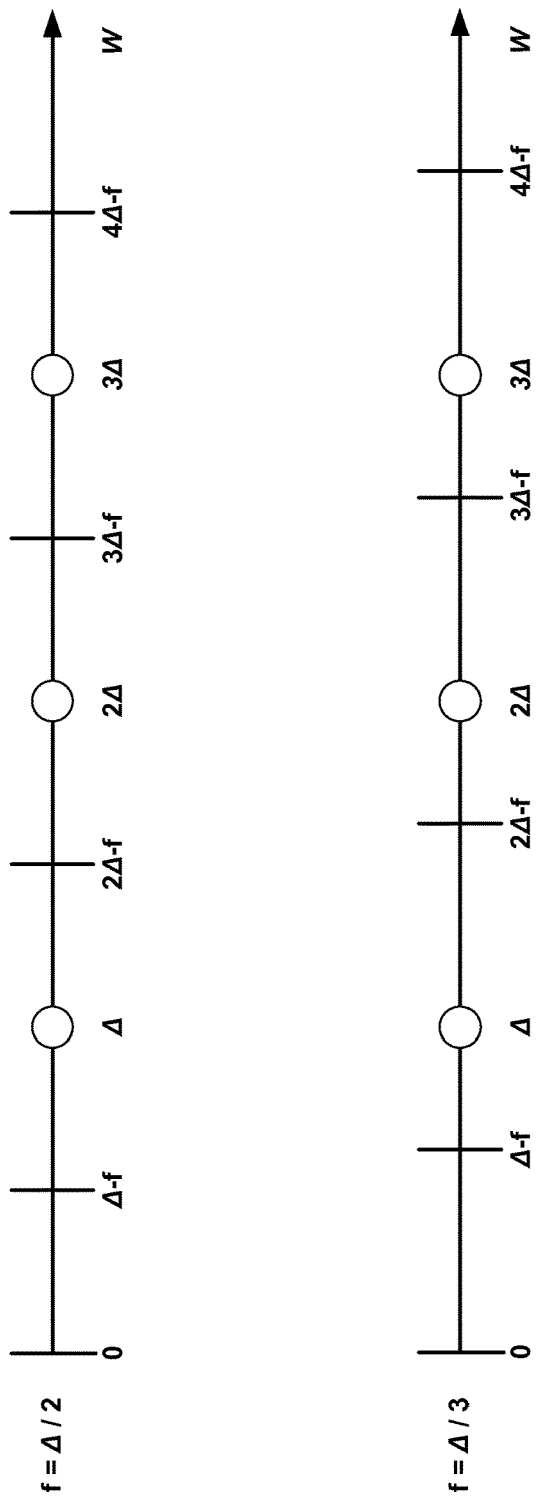
FIG. 4 is a conceptual diagram illustrating scalar quantization with deadzone.

FIG. 4 is a conceptual diagram illustrating scalar quantization with deadzone. In the example of FIG. 4, each circle illustrates a reconstruction value W' and each vertical line indicates a decision level. As can be seen from FIG. 4, the quantization offset f controls the size of the deadzone (i.e., the interval that maps to 0). The quantization offset f also shifts the reconstruction level away from the center of the interval.

The example of FIG. 4 shows the cases where $f=\Delta/2$ and $f=\Delta/3$, where f represents the quantization offset in accordance with formula (1) described above. It can be observed from the example of FIG. 4 that when the quantization offset is decreased from $f=\Delta/2$ to $f=\Delta/3$, the deadzone increases and the reconstructed level shifts toward 0. To minimize the reconstruction error, the reconstructed value may be equal to the mean of the interval with respect to the distribution of the transformed coefficients. The distribution of the transformed coefficients may be modeled as a Laplacian distribution. That is, the quantization offset f that gives the minimal reconstruction error should be less than Δ/2. In addition, by reducing the quantization offset f lower than Δ/2, coefficients originally quantized to level n may be quantized to n−1. In HEVC, the quantization offset f is empirically set to be Δ/3 for intra-mode and Δ/6 for inter-mode.

Figure 5:
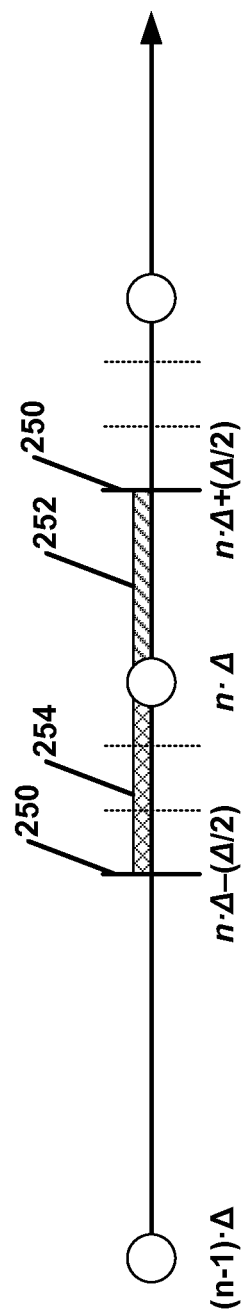
FIG. 5 is a conceptual diagram illustrating quantization offset and level decision.

FIG. 5 is a conceptual diagram illustrating quantization offset and level decision. In other words, FIG. 5 shows a relationship between a quantization offset and a resulting level. In the example of FIG. 5, vertical bars 250 indicate the decision level when the quantization offset is Δ/2. As the quantization offset changes (shown in FIG. 5 as dashed vertical bars), the value may be quantized as level n or level n−1 depending on where the value falls. If the value falls in the range from n·Δ to (n+½)·Δ, no matter what the quantization offset is, the quantized level may still be n, as illustrated in FIG. 5 by zone 252. However, if the value falls in the range from (n−½)·Δ to n·Δ (zone 254), then depending on the quantization offset and where the value falls, the quantization level can be n or n−1.

Figure 6:
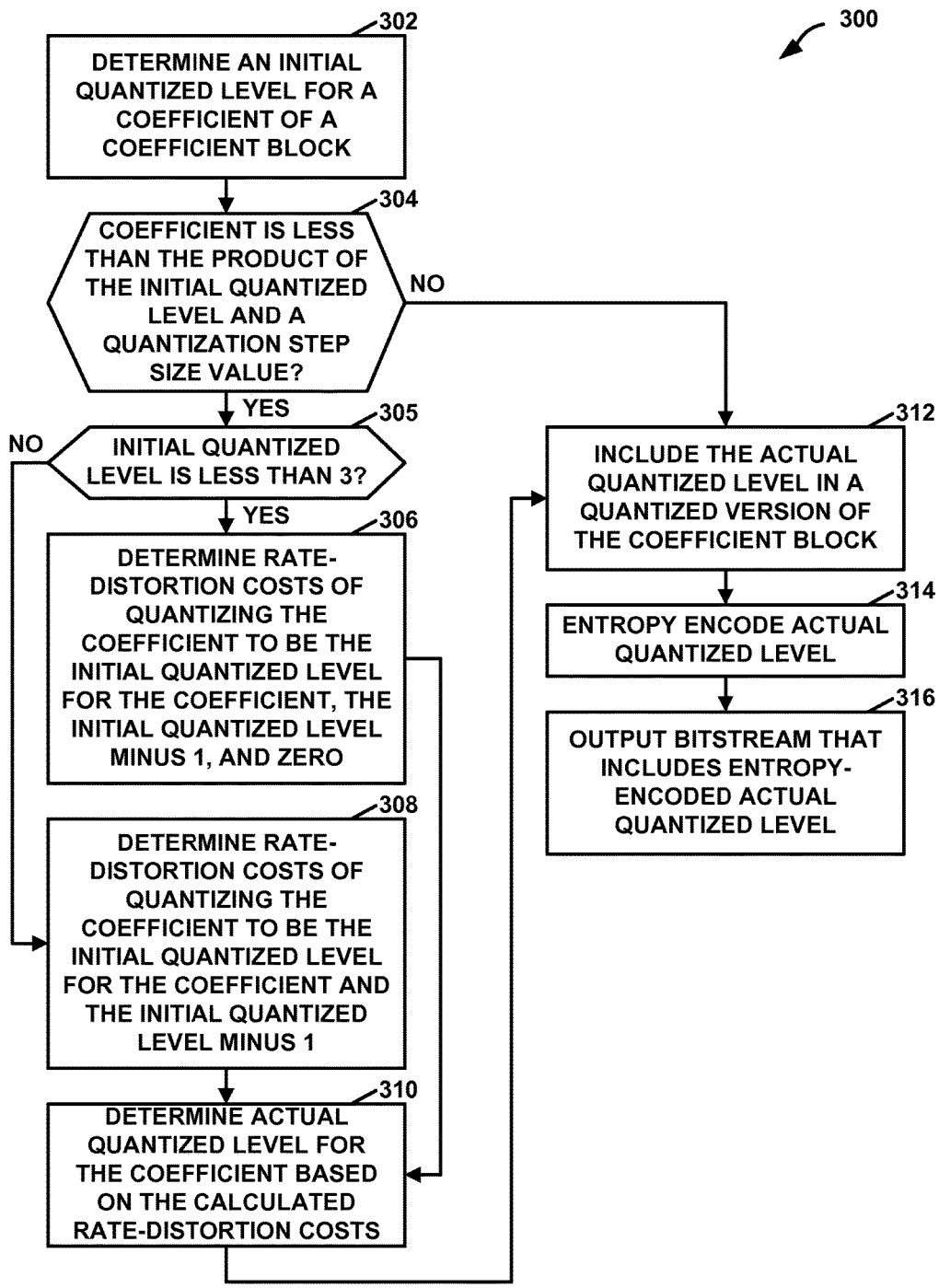
FIG. 6 is a flowchart illustrating an example operation to quantize a coefficient, in accordance with one or more techniques of this disclosure.

FIG. 6 is a flowchart illustrating an example operation 300 to quantize a coefficient, in accordance with one or more techniques of this disclosure. In the example of FIG. 6, quantization unit 106 may determine an initial quantized level for a coefficient of a coefficient block (302). The coefficient may occur after a first non-zero coefficient in a reverse scan order in the coefficient block. Furthermore, quantization unit 106 may determine whether the coefficient is less than the product of the initial quantized level and a quantization step size value (304).

In response to determining that the transform coefficient is less than the product of the initial quantized level and the quantization step size value ("YES" of 304), quantization unit 106 may determine whether the initial quantized level is less than three (305). In response to determining that the initial quantized level is less than three ("YES" of 305), rate-distortion costs of quantizing the coefficient to be the initial quantized level for the coefficient, the initial quantized level minus one, and zero (306). Thus, quantization unit 106 may determine, in response to determining that the initial quantized level is less than three, rate-distortion costs of quantizing the coefficient to be the initial quantized level for the coefficient, the initial quantized level minus one, and zero. Furthermore, in response to determining that the initial quantized level for the coefficient is not less than three ("NO" of 305), quantization unit 106 may determine rate-distortion costs of quantizing the coefficient to be the initial quantized level and the initial quantized level minus one (308). That is, quantization unit 106 may determine, in response to determining that the initial quantized level is greater than or equal to three, rate-distortion costs of quantizing the coefficient to be the initial quantized level and the initial quantized level minus one. More generally, quantization unit 106 may determine whether the coefficient is less than the product of the initial quantized level and a quantization step size value. In response to determining that the transform coefficient is less than the product of the initial quantized level and the quantization step size value, quantization unit 106 may determine rate-distortion costs of quantizing the coefficient to be the initial quantized level and the initial quantized level minus one.

After performing action 306 or action 308, quantization unit 106 may determine an actual quantized level for the coefficient based, at least in part, on the calculated rate-distortion costs (310). After performing actions 306 or 308 and 310, or in response to determining that the coefficient is not less than the product of the initial quantized level and the quantization step size value ("NO" of 304), quantization unit 106 may include the actual quantized level in a quantized version of the coefficient block (312). If the coefficient is not less than the product of the initial quantized level and the quantization step size value, the actual quantized level may be the initial quantized level for the coefficient. In addition, quantization unit 106 may entropy encode (e.g., CABAC encode) the actual quantized level (314). Quantization unit 106 may output a bitstream that includes the entropy-encoded actual quantized level (316).

Figure 7:
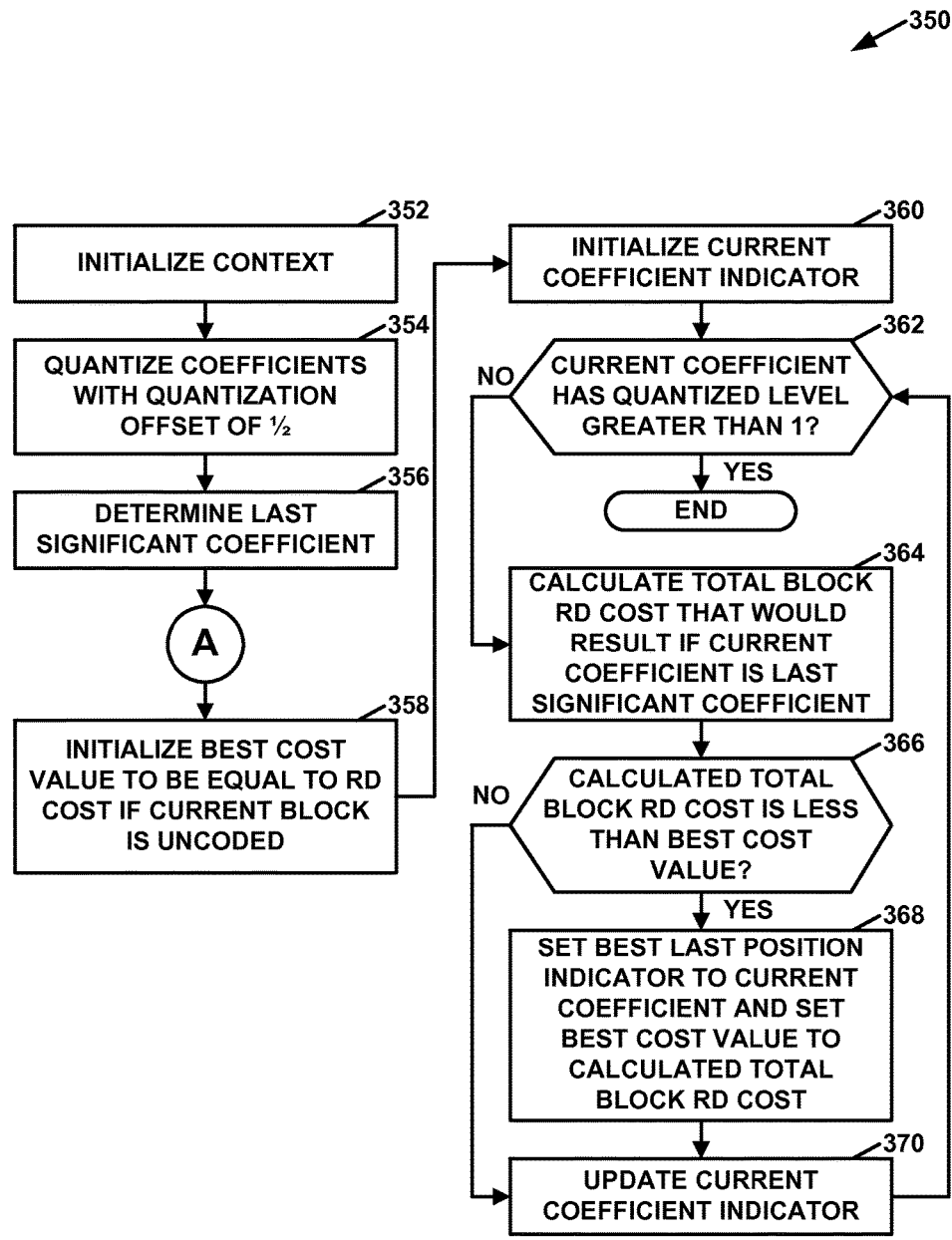
FIG. 7 is a flowchart illustrating an example operation to quantize coefficients of a coefficient block, in accordance with one or more techniques of this disclosure.

FIG. 7 is a flowchart illustrating an example operation 350 to quantize coefficients of a coefficient block, in accordance with one or more techniques of this disclosure. Operation 350 of FIG. 7 may implement techniques similar to those of operation 300 of FIG. 6. In the example of FIG. 7, quantization unit 106 may initialize a context (352) such as C1=1, C2=0. Quantization unit 106 may use the context in determining RD costs. Furthermore, quantization unit 106 may scan through the coefficients of the coefficient block in a reverse diagonal scan order and quantize the coefficients in the coefficient block using a quantization offset of ½ (354). Next, quantization unit 106 may determine a last significant coefficient of the coefficient block (356). The last significant coefficient may be the first non-zero transform coefficient in the reverse scan order. When scanning the coefficients in a reverse diagonal scan order (that is, generally proceeding from highest-frequency coefficients to lowest-frequency coefficients), the last significant coefficient is the first encountered coefficient that is quantized to a non-zero level.

Figure 8:
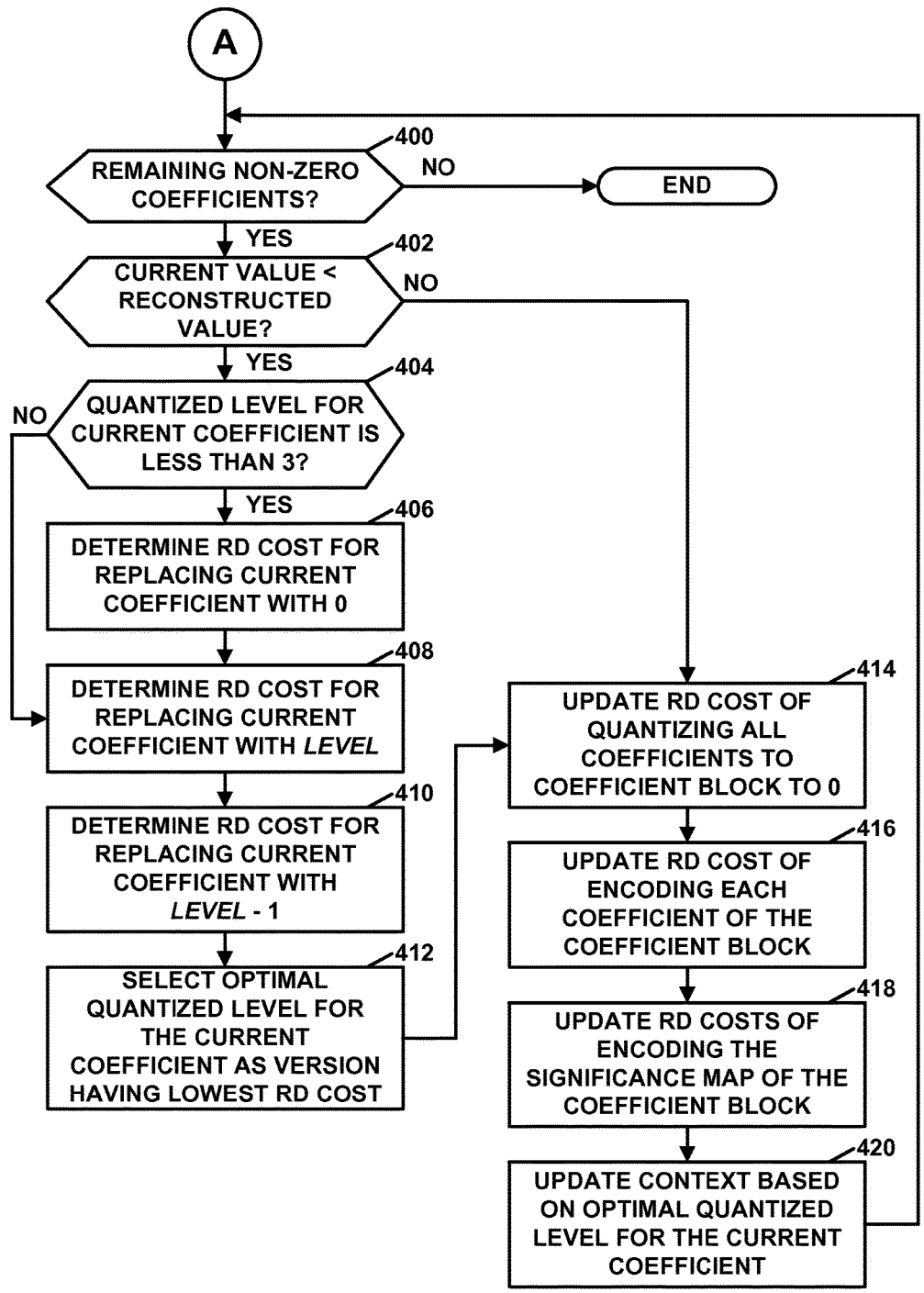
FIG. 8 is a flowchart illustrating an example portion of the operation of FIG. 7.

After determining the last significant coefficient of the coefficient block, quantization unit 106 may perform the portion of operation 350 illustrated in FIG. 8. FIG. 8 is described in detail later in this disclosure. When quantization unit 106 performs the portion of operation 350 illustrated in FIG. 8, quantization unit 106 may determine, for each respective remaining non-zero coefficient, an optimal level for the respective remaining non-zero coefficient. As described below with regard to FIG. 8, quantization unit 106 may determine the optimal level for the respective remaining non-zero coefficient based at least in part on RD costs of quantized levels for the respective remaining non-zero coefficient. The remaining coefficients are coefficients that occur after the last significant coefficient according to the reverse diagonal scan order.

After performing the portion of operation 350 illustrated in FIG. 8, quantization unit 106 may initialize a best code value to be equal to an RD cost if the current block is un-coded (358). That is, quantization unit 106 may determine the RD cost that would result from quantizing each coefficient of the coefficient block to 0. Quantization unit 106 may set the best code value to be equal to this RD cost.

In addition, quantization unit 106 may initialize a current coefficient indicator (360). In some examples, quantization unit 106 may initialize the current coefficient indicator to indicate the last coefficient (e.g., the bottom right coefficient) of the coefficient block. The current coefficient indicator indicates a coefficient in the coefficient block. This disclosure may refer to the coefficient indicated by the current coefficient indicator as the current coefficient.

Next, quantization unit 106 may determine whether the current coefficient has a quantized level greater than 1 (362). In response to determining that the current coefficient has a quantized level greater than 1 ("YES" of 362), quantization unit 106 may end operation 350. On the other hand, in response to determining that the current coefficient does not have a quantized level greater than 1 ("NO" of 362), quantization unit 106 may calculate a total block RD cost that would result if the current coefficient is the last significant coefficient (364). Here, the total block RD cost may be calculated as follows $\Sigma_{i=1}^{N}$ Distortion($C_i$)+$\lambda \cdot (\Sigma_{i=1}^{N}(R_i + R_{pos_x} + R_{pos_y} + R_{significance\_map}))$ where N is the total number of the coefficients in the current TU, $C_i$ is the coefficient i in TU, $\lambda$ is a fixed value, $R_i$ the number of the bits to encode the quatized level of the coefficient, $C_i$, $R_{pos_x}$, $R_{pos_y}$ are the number of bits to encode the position x, and y for the last significant coefficients, and $R_{significance\_map}$ is the number of bits to encode the significance map.

Furthermore, quantization unit 106 may determine whether the calculated total block RD cost is less than the best cost value (366). In response to determining that the calculated total block RD cost is less than the best cost value ("YES" of 366), quantization unit 106 may set a best last position indicator to the current position and may set the best cost value to the calculated total block RD cost (368). The current position is the position within the coefficient block of the current coefficient.

After setting the best last position indicator and the best cost value or after determining that the calculated total block RD cost is not less than the best cost value ("NO" of 366), quantization unit 106 may update the current coefficient indicator such that the current coefficient indicator indicates a next coefficient in the coefficient block, according to the reverse diagonal scan order (370). Quantization unit 106 may then determine again whether the current coefficient has a quantized level greater than 1 (362). In this way, quantization unit 106 may scan through the coefficients of the coefficient block according to a reverse diagonal scan order until quantization unit 106 encounters a coefficient whose quantized level is greater than 1.

FIG. 8 is a flowchart illustrating an example portion of operation 350 of FIG. 7. As indicated in the example of FIG. 8, quantization unit 106 may determine whether there are any remaining non-zero coefficients in the coefficient block (400). In response to determining that there are no remaining non-zero coefficients in the coefficient block ("NO" of 400), quantization unit 106 may have determined the optimal values of each coefficient in the coefficient block and, accordingly, may continue performing the portion of operation 350 illustrated in FIG. 7.

On the other hand, in response to determining that there are one or more remaining non-zero coefficients in the coefficient block ("YES" of 400), quantization unit 106 may determine whether the current value of the current coefficient is less than a reconstructed value of the current coefficient (402). The current value of the current coefficient may be the value of the current coefficient prior to quantization. The reconstructed value of the current coefficient may be equal to Level*StepSize, where Level is the quantized level for the current coefficient, as determined in action 354 of FIG. 7. StepSize is the size of the quantization step 4 used to quantize the current coefficient.

In response to determining that the current value of the current coefficient is less than the reconstructed value of the current coefficient ("YES" of 402), quantization unit 106 may determine whether the quantized level (Level) of the current coefficient is less than 3 (404). In response to determining that the quantized level for the current coefficient is less than 3 ("YES" of 404), quantization unit 106 may determine the RD cost for replacing the current coefficient with 0 (406). After determining the RD cost for replacing the current coefficient with 0 or in response to determining that the quantized level for the current coefficient is not less than 3 ("NO" of 404), quantization unit 106 may determine the RD cost for replacing the current coefficient with the quantized level for the current coefficient (i.e., Level) (408). In addition, quantization unit 106 may determine the RD cost for replacing the current coefficient with the quantized level for the current coefficient (i.e., Level-1) (410). Furthermore, quantization unit 106 may select an optimal quantized level for the current coefficient as whichever of Level, Level-1, and 0 has the lowest RD cost (412). In this way, quantization unit 106 may select an actual quantized level that produces a lowest rate-distortion cost.

After selecting the optimal quantized level for the current coefficient or in response to determining that the current value of the current coefficient is not less than the reconstructed value of the current coefficient ("NO" of 402), quantization unit 106 may update the RD cost of quantizing all coefficients of the coefficient block to 0 (414). In addition, quantization unit 106 may update the RD cost of encoding each coefficient of the coefficient block (416). Quantization unit 106 may update the RD cost of encoding each coefficient of the coefficient block by adding the RD cost of the current coefficient to a running sum of the RD costs of previously-processed coefficients of the coefficient block. Furthermore, quantization unit 106 may update the RD cost of encoding the significance map of the coefficient block (418). Quantization unit 106 may determine the optimal value of the last significant coefficient of the current block based at least in part on the RD cost of quantizing all coefficients of the coefficient block to 0, the RD cost of encoding each coefficient of the coefficient block, and the RD cost of encoding the significance map of the coefficient block.

In addition, quantization unit 106 may update the context based on the determined optimal quantized level for the current coefficient (420). Quantization unit 106 may use the context in the level decision of the next coefficient in the coefficient block. After updating the context, quantization unit 106 may determine again whether there are any remaining non-zero coefficients (400). In this way, quantization unit 106 may determine the optimal values of each of the coefficients in the coefficient block.

Thus, in operation 350 of FIGS. 7 and 8, the third step of the RDOQ technique (i.e., determining the optimal level for a coefficient) may be simplified as:

3. Decision of the optimal level
   I. Fix last significant coefficient: the first coefficient that is quantized to non-zero in reverse diagonal scan
   II. For the remaining non-zero coefficients in the reverse diagonal scan, choose optimal level based on RD cost
      a. If currentValue<Level*StepSize, that is, currentValue<reconstructedValue, Choose the best level $L_{Lopt}$.
         i. If Level<3, Calculate the RD cost of Level, Level-1 and 0
         ii. If Level>=3, Calculate the RD cost of Level, Level-1
      b. Update encoding cost
         i. Cost of quantized to 0 (for uncoded block)
         ii. Cost of encoding each coefficient
         iii. Cost of encoding significance map
      c. Update context based on the decided level $L_{opt}$. The context will be used by the level decision of the next coefficient
   III. Encode the next coefficient, and go to step II.

The performance of the example techniques of FIGS. 6-8 is shown in Tables 6-9, below. As shown in Tables 6-9, there is almost no RD performance loss incurred by implementing the techniques of FIGS. 6-8. Furthermore, a level decision saving $\text{Level}_{save}$ may be calculated. $\text{Level}_{save}$ defined as follows:

$$\text{Level}_{save} = \frac{N_{[n \cdot \Delta, (n+\frac{1}{2}) \cdot \Delta]}}{N_{total}}$$

In the equation above, $N_{[n \cdot \Delta, (n+\frac{1}{2}) \cdot \Delta]}$ is the number of values that fall in the range from $n \cdot \Delta$ to $(n+\frac{1}{2}) \cdot \Delta$ and $N_{total}$ is the total number of values for which a level decision is performed. Experimental results show that $\text{Level}_{save}$ is i between 60% and 80%. That is, 60% to 80% of the level decisions can be skipped and the computation involved in RDOQ has been reduced.

TABLE 6

| | All Intra HE | | |
|---|---|---|---|
| | Y | U | V |
| Class A | 0.0% | 0.0% | 0.0% |
| Class B | 0.0% | 0.0% | 0.0% |
| Class C | 0.0% | 0.0% | 0.0% |
| Class D | 0.0% | 0.0% | 0.0% |
| Class E | 0.0% | 0.0% | 0.0% |
| Class F | 0.0% | 0.0% | 0.0% |
| Overall | 0.0% | 0.0% | 0.0% |
| | 0.0% | 0.0% | 0.0% |
| Enc Time [%] | | 101% | |

TABLE 7

| | Low delay B HE | | |
|---|---|---|---|
| | Y | U | V |
| Class A | | | |
| Class B | 0.1% | 0.1% | 0.1% |
| Class C | 0.1% | 0.1% | 0.0% |
| Class D | 0.0% | 0.1% | 0.1% |
| Class E | 0.0% | 1.0% | 0.9% |
| Class F | −0.1% | 0.3% | 0.1% |
| Overall | 0.0% | 0.3% | 0.2% |
| | 0.0% | 0.2% | 0.2% |
| Enc Time [%] | | 99% | |

TABLE 8

| | Random Access HE | | |
|---|---|---|---|
| | Y | U | V |
| Class A | −0.1% | 1.9% | 2.0% |
| Class B | 0.0% | 0.2% | 0.1% |
| Class C | 0.0% | 0.1% | 0.2% |
| Class D | 0.0% | 0.1% | 0.1% |
| Class E | | | |
| Class F | 0.0% | 0.2% | 0.2% |
| Overall | 0.0% | 0.5% | 0.5% |
| | 0.3% | 0.6% | 0.6% |
| Enc Time [%] | | 101% | |

TABLE 9

| | Low Delay P HE | | |
|---|---|---|---|
| | Y | U | V |
| Class A | | | |
| Class B | 0.1% | 0.3% | 0.1% |
| Class C | 0.0% | 0.1% | 0.1% |
| Class D | 0.0% | 0.2% | 0.2% |
| Class E | 0.0% | −0.2% | −0.1% |
| Class F | 0.0% | 0.4% | 0.0% |
| Overall | 0.0% | 0.2% | 0.1% |
| | 0.0% | 0.2% | 0.0% |
| Enc Time [%] | | 102% | |

Figure 9:
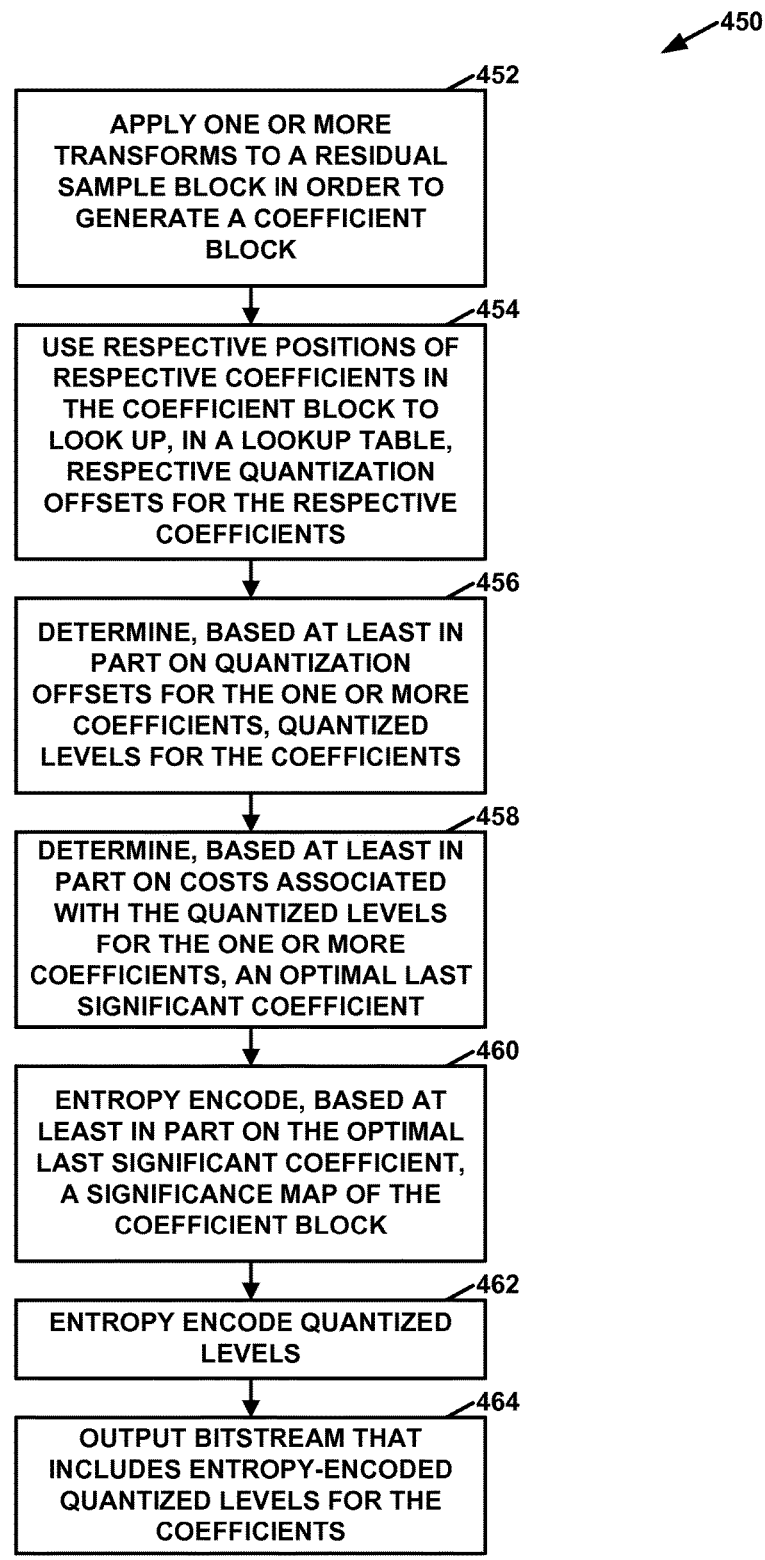
FIG. 9 is a flowchart illustrating another example operation to quantize coefficients of a coefficient block, in accordance with one or more techniques of this disclosure.

FIG. 9 is a flowchart illustrating an example operation 450 to quantize coefficients of a coefficient block, in accordance with one or more techniques of this disclosure. Video encoder 20 may perform operation 450 as an alternative to performing operation 300 of FIG. 6 or operation 350 of FIGS. 7 and 8.

As illustrated in the example of FIG. 9, transform processing unit 104 may apply one or more transforms to a residual sample block in order to generate a coefficient block (452). In addition, transform processing unit 104 may use respective positions of respective coefficients in a coefficient block to look up, in a lookup table, respective quantization offsets for the respective coefficients (454). In some examples, for each respective position in the coefficient block, an entry in the lookup table for the respective position is based at least in part on frequencies with which a RDOQ algorithm selects Level, Level-1, or 0 as optimal quantized values for coefficients that are located at the respective position within other test data coefficient blocks, wherein Level denotes an initial quantized value for a coefficient.

Furthermore, quantization unit 106 may determine, based at least in part on the respective quantization offsets for the one or more coefficients, respective quantized levels for the respective coefficients (456). Quantization unit 106 may determine, based at least in part on costs associated with the quantized levels for the one or more coefficients, an optimal last significant coefficient (458). Entropy encoding unit 116 may entropy encode, based at least in part on the optimal last significant coefficient, a significance map of the coefficient block (460). In addition, entropy encoding unit 116 may entropy encode the quantized levels for coefficients that have positions within the coefficient block that are before the position within the coefficient block of the optimal last significant coefficient (462). Furthermore, video encoder 20 may output a bitstream that includes the entropy encoded quantized levels (464).

Figure 10:
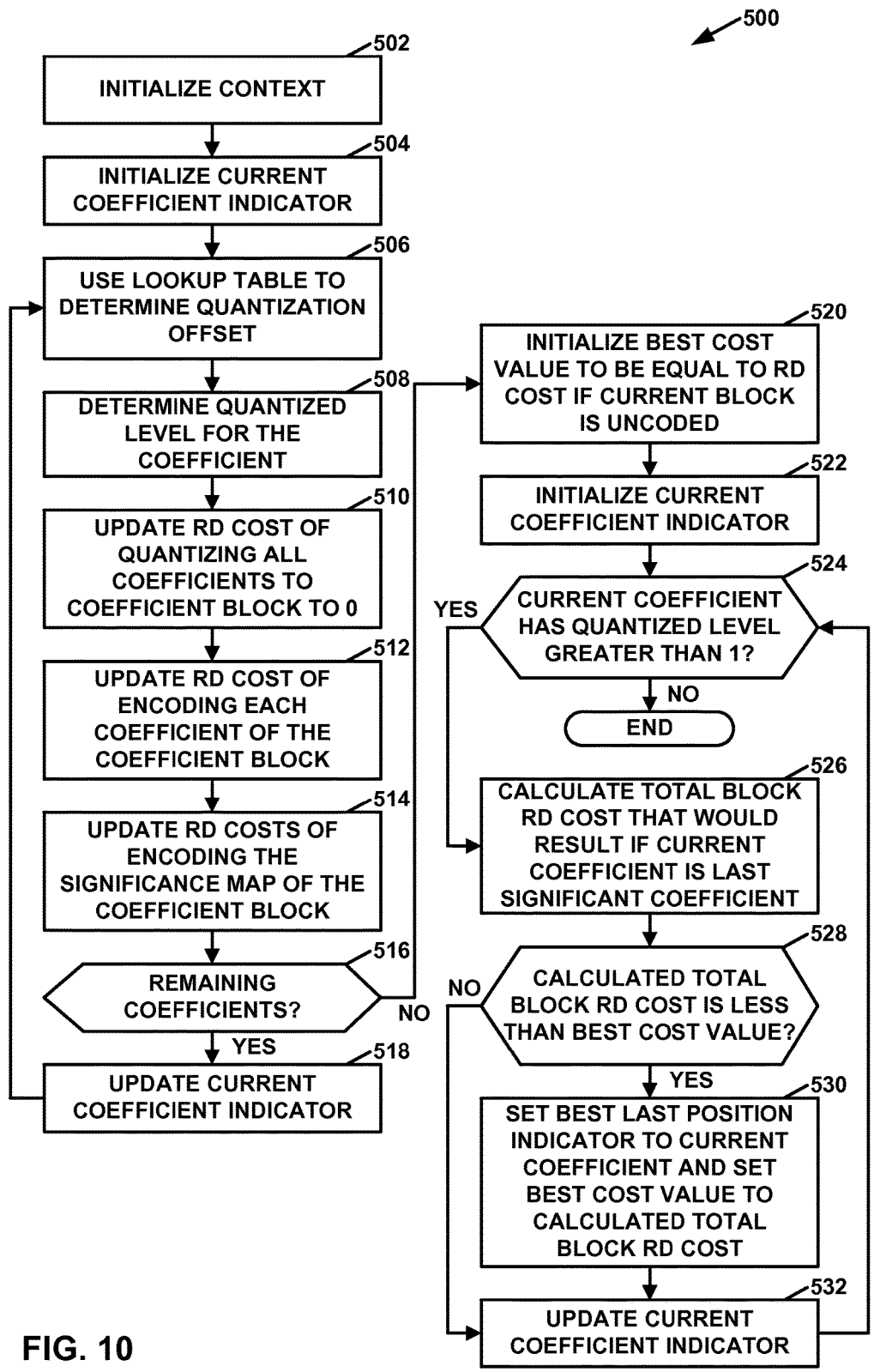
FIG. 10 is a flowchart illustrating another example operation to quantize coefficients of a coefficient block, in accordance with one or more techniques of this disclosure.

FIG. 10 is a flowchart illustrating another example operation 500 to quantize coefficients of a coefficient block, in accordance with one or more techniques of this disclosure. Operation 500 may use similar techniques as those in operation 450 of FIG. 9.

As illustrated in the example of FIG. 10, quantization unit 106 may initialize a context (502). As previously described, quantization unit 106 may use the context in determining RD costs. In addition, quantization unit 106 may initialize a current coefficient indicator (504). In some examples, quantization unit 106 may initialize the current coefficient indicator to indicate the last coefficient (e.g., the bottom right coefficient) of the coefficient block. The current coefficient indicator indicates a coefficient in the coefficient block. This disclosure may refer to the coefficient indicated by the current coefficient indicator as the current coefficient.

Next, quantization unit 106 may, in accordance with the techniques of this disclosure, use a lookup table to determine a quantization offset for the current coefficient (506). Thus, quantization unit 106 may use the position of the current coefficient to look up a quantization offset for the current coefficient. In some examples, the lookup table may include a quantization offset for each position in the coefficient block. In such examples, for each respective position in the coefficient block, a quantization offset in the lookup table for the respective position is based at least in part on frequencies with which coefficients at the respective position in other coefficient blocks are quantized to Level, Level-1, and 0, where Level is an initial quantized level for a coefficient.

In some examples, quantization unit 106 may, for each respective coefficient, determine $$z = \left\lfloor \frac{|W| + f}{\Delta} \right\rfloor \cdot \text{sign}(W) \qquad (1)$$

where z is the quantized level for the respective coefficient, W is the initial value of the respective coefficient, f is the quantization offset for the coefficient, $\Delta$ is a quantization step, $\lfloor \cdot \rfloor$ denotes rounding to the nearest integer towards minus infinity and sign( ) is a function that returns the sign of the initial value of the respective coefficient.

Furthermore, quantization unit 106 may determine, based at least in part on the determined quantization offset, a quantized level (Level) for the current coefficient (508). Quantization unit 106 may use equation (1) above to determine the quantized level for the current coefficient.

Quantization unit 106 may then update the RD cost of quantizing all coefficients of the coefficient block to 0 (510). In addition, quantization unit 106 may update the RD cost of encoding each coefficient of the coefficient block (512). Furthermore, quantization unit 106 may update the RD cost of encoding the significance map of the coefficient block (514). Quantization unit 106 may determine the optimal value of the last significant coefficient of the current block based at least in part on the RD cost of quantizing all coefficients of the coefficient block to 0, the RD cost of encoding each coefficient of the coefficient block, and the RD cost of encoding the significance map of the coefficient block.

Quantization unit 106 may then determine whether there are any remaining coefficients in the coefficient block (516). In response to determining that there are one or more remaining coefficients in the coefficient block ("YES" of 516), quantization unit 106 may update the current coefficient indicator such that the current coefficient indicator indicates a next coefficient in the coefficient block, according to the reverse diagonal scan order (518). Quantization unit 106 may then use the lookup table again to determine a quantization offset for the new current coefficient (506). In this way, quantization unit 160 may determine the quantized levels for the coefficients in a reverse diagonal scan order. Furthermore, in this way, quantization unit 106 may, for each respective remaining coefficient in the coefficient block, use the lookup table to determine a quantization level for the respective remaining coefficient and may determine a quantized level for the respective remaining coefficient based at least in part on the quantized level for the respective remaining coefficient.

On the other hand, in response to determining that there are no further remaining coefficients in the coefficient block ("NO" of 516), quantization unit 106 may initialize a best code value to be equal to an RD cost if the current block is un-coded (520). In addition, quantization unit 106 may initialize a current coefficient indicator (522). In some examples, quantization unit 106 may initialize the current coefficient indicator to indicate the last coefficient (e.g., the bottom right coefficient) of the coefficient block. The current coefficient indicator indicates a coefficient in the coefficient block. This disclosure may refer to the coefficient indicated by the current coefficient indicator as the current coefficient.

Next, quantization unit 106 may determine whether the current coefficient has a quantized level greater than 1 (524). In response to determining that the current coefficient has a quantized level greater than 1 ("YES" of 524), quantization unit 106 may end operation 500. On the other hand, in response to determining that the current coefficient does not have a quantized level greater than 1 ("NO" of 524), quantization unit 106 may calculate a total block RD cost that would result if the current coefficient is the last significant coefficient (526).

Furthermore, quantization unit 106 may determine whether the calculated total block RD cost is less than the best cost value (528). In response to determining that the calculated total block RD cost is less than the best cost value ("YES" of 528), quantization unit 106 may set a best last position indicator to the current position and may set the best cost value to the calculated total block RD cost (530). The current position is the position of the current coefficient within the coefficient block.

After setting the best last position indicator and the best cost value or after determining that the calculated total block RD cost is not less than the best cost value ("NO" of 528), quantization unit 106 may update the current coefficient indicator such that the current coefficient indicator indicates a next coefficient in the coefficient block, according to the reverse diagonal scan order (532). Quantization unit 106 may then determine again whether the current coefficient has a quantized level greater than 1 (524). In this way, quantization unit 106 may scan through the coefficients of the coefficient block according to a reverse diagonal scan order until quantization unit 106 encounters a coefficient whose quantized level is greater than 1. Furthermore, in this way, the costs associated with the quantized levels for the one or more coefficients include rate distortion costs associated with selecting each one of the one or more coefficients as a last significant coefficient.

Thus, the operation of FIG. 10 may implement the following simplified RDOQ algorithm:
1. Initialize context: C1=1, C2=0;
2. Lookup quantization offset table, quantize the coefficients with the offset from the quantization table in reverse diagonal scan order;
3. Cost calculation for last significant coefficient decision in step 5
    1) Cost of quantized to 0 (for uncoded block)
    2) Cost of encoding each coefficient
    3) Cost of encoding significance map
4. Process the next coefficient, and go to step 2.
5. Decision of the optimal last significant coefficient
    1) Initialize d64BestCost to be the RD cost if the current block is uncoded;
    2) In reverse diagonal scan, calculate the total block cost totalCost if the current coefficient is the last significant coefficient
    3) If totalCost<d64BestCost, new best last position (iBestLastIdxP1) is current position, d64BestCost=totalCost
    4) Iterate until LevelofCurCoeff>1.

Tables 10-13, below, illustrate example performance of the operations of FIGS. 9 and 10 with the quantization offset being ½ with skipped level decision (i.e., the third step of RDOQ) and optimal last significant coefficient, as compared to the performance of a video encoder with RDOQ on. Comparing the simplified RDOQ algorithm of FIGS. 9 and 10 and the original RDOQ algorithm, the selection of the RD optimal level now is replaced by quantization with offset. This may reduce the complexity of RDOQ with a small RD performance loss. For instance, if video encoder 20 selects the quantization offset of ½ and the level decision (i.e., the third step of RDOQ) is skipped, the performance of the techniques of FIGS. 9 and 10 compared with RDOQ, as shown in Tables 10-13, shows a RD performance loss from 1% to 3%.

TABLE 10

| | All Intra HE | | |
|---|---|---|---|
| | Y | U | V |
| Class A | 1.0% | 3.8% | 3.5% |
| Class B | 1.2% | 3.2% | 3.3% |
| Class C | 1.0% | 2.0% | 2.1% |
| Class D | 1.0% | 2.4% | 2.0% |
| Class E | 1.1% | 3.6% | 3.1% |
| Class F | 0.7% | 0.9% | 1.1% |
| Overall | 1.0% | 2.6% | 2.5% |
| | 1.0% | 2.6% | 2.5% |
| Enc Time [%] | | 96% | |
| Dec Time [%] | | #NUM! | |

TABLE 11

| | Low delay B HE | | |
|---|---|---|---|
| | Y | U | V |
| Class A | | | |
| Class B | 3.2% | 3.2% | 2.8% |
| Class C | 3.2% | 3.1% | 2.5% |
| Class D | 2.7% | 2.8% | 1.8% |
| Class E | 2.4% | 1.5% | 2.3% |
| Class F | 1.7% | 1.7% | 2.3% |
| Overall | 2.7% | 2.6% | 2.3% |
| | 2.7% | 2.5% | 2.3% |
| Enc Time [%] | | 94% | |
| Dec Time [%] | | #NUM! | |

TABLE 12

| | Random Access HE | | |
|---|---|---|---|
| | Y | U | V |
| Class A | 2.3% | 5.0% | 5.2% |
| Class B | 1.7% | 2.5% | 2.5% |
| Class C | 1.7% | 1.9% | 1.9% |
| Class D | 1.6% | 1.8% | 1.2% |
| Class E | | | |
| Class F | 1.1% | 1.5% | 1.3% |
| Overall | 1.7% | 2.5% | 2.4% |
| | 1.7% | 2.6% | 2.5% |
| Enc Time [%] | | 94% | |
| Dec Time [%] | | #NUM! | |

TABLE 13

| | Low Delay P HE | | |
|---|---|---|---|
| | Y | U | V |
| Class A | | | |
| Class B | 3.3% | 3.6% | 3.4% |
| Class C | 3.4% | 3.6% | 3.1% |

TABLE 13-continued

| | Low Delay P HE | | |
|---|---|---|---|
| | Y | U | V |
| Class D | 3.0% | 2.9% | 2.8% |
| Class E | 2.9% | 2.2% | 1.6% |
| Class F | 2.0% | 2.7% | 2.5% |
| Overall | 3.0% | 3.1% | 2.8% |
| | 3.0% | 3.0% | 2.7% |
| Enc Time [%] | | 101% | |
| Dec Time [%] | | #NUM! | |

Tables 14-17, below, illustrate the example performance of the operations of FIGS. 9 and 10 with the quantization offset being ⅓ for intra and ⅙ for inter with skipped level decision and optimal last significant coefficient, where anchor has RDOQ on. That is, if the quantization offset is chosen to be ⅓ for intra mode and ⅙ for inter mode, Tables 14-17 show that the RD performance loss is from 1.9% to 3.6%.

TABLE 14

| | All Intra HE | | |
|---|---|---|---|
| | Y | U | V |
| Class A | 2.5% | 0.6% | 0.5% |
| Class B | 2.5% | 1.6% | 1.7% |
| Class C | 2.1% | 1.6% | 1.5% |
| Class D | 2.1% | 1.4% | 1.5% |
| Class E | 2.4% | 1.5% | 1.6% |
| Class F | 2.7% | 1.8% | 2.1% |
| Overall | 2.4% | 1.4% | 1.5% |
| | 2.4% | 1.5% | 1.5% |
| Enc Time [%] | | 91% | |
| Dec Time [%] | | #NUM! | |

TABLE 15

| | Low delay B HE | | |
|---|---|---|---|
| | Y | U | V |
| Class A | | | |
| Class B | 1.9% | 3.8% | 2.9% |
| Class C | 1.9% | 4.1% | 4.0% |
| Class D | 2.4% | 5.9% | 5.3% |
| Class E | 0.7% | 3.5% | 2.8% |
| Class F | 3.4% | 3.6% | 4.0% |
| Overall | 2.1% | 4.2% | 3.8% |
| | 2.1% | 4.1% | 3.7% |
| Enc Time [%] | | 90% | |
| Dec Time [%] | | #NUM! | |

TABLE 16

| | Random Access HE | | |
|---|---|---|---|
| | Y | U | V |
| Class A | 3.3% | 6.4% | 7.3% |
| Class B | 3.7% | 6.8% | 6.3% |
| Class C | 3.6% | 7.1% | 7.1% |
| Class D | 3.8% | 6.7% | 6.2% |
| Class E | | | |
| Class F | 3.9% | 5.6% | 5.3% |
| Overall | 3.6% | 6.5% | 6.4% |
| | 3.9% | 6.5% | 6.4% |
| Enc Time [%] | | 91% | |
| Dec Time [%] | | #NUM! | |

TABLE 17

| | Low Delay P HE | | |
|---|---|---|---|
| | Y | U | V |
| Class A | | | |
| Class B | 1.4% | 3.3% | 2.4% |
| Class C | 1.7% | 4.0% | 4.1% |
| Class D | 2.3% | 5.7% | 5.3% |
| Class E | 0.4% | 2.7% | 2.5% |
| Class F | 3.6% | 3.3% | 4.0% |
| Overall | 1.9% | 3.8% | 3.6% |
| | 1.8% | 3.8% | 3.5% |
| Enc Time [%] | | 92% | |
| Dec Time [%] | | #NUM! | |

Tables 18-21, below, illustrate example performance of the operations of FIGS. 9 and 10 with the quantization offset being ½ for intra and ⅙ for inter with skipped level decision and optimal last significant coefficient, where anchor has RDOQ on.

That is, if the quantization offset is set to be ½ for intra mode and ⅙ for inter mode, the RD performance loss may be from 1% to 2.5%.

TABLE 18

| | All Intra HE | | |
|---|---|---|---|
| | Y | U | V |
| Class A | 1.0% | 3.8% | 3.5% |
| Class B | 1.2% | 3.2% | 3.3% |
| Class C | 1.0% | 2.0% | 2.1% |
| Class D | 1.0% | 2.4% | 2.0% |
| Class E | 1.1% | 3.6% | 3.1% |
| Class F | 0.7% | 0.9% | 1.1% |
| Overall | 1.0% | 2.6% | 2.5% |
| | 1.0% | 2.6% | 2.5% |
| Enc Time [%] | | 100% | |
| Dec Time [%] | | 101% | |

TABLE 19

| | Low delay B HE | | |
|---|---|---|---|
| | Y | U | V |
| Class A | | | |
| Class B | 1.7% | 3.6% | 2.6% |
| Class C | 1.8% | 4.1% | 3.6% |
| Class D | 2.2% | 5.4% | 5.3% |
| Class E | 0.1% | 2.1% | 1.5% |
| Class F | 2.4% | 1.8% | 2.3% |
| Overall | 1.7% | 3.5% | 3.1% |
| | 1.7% | 3.4% | 3.0% |
| Enc Time [%] | | 97% | |
| Dec Time [%] | | 98% | |

TABLE 20

| | Random Access HE | | |
|---|---|---|---|
| | Y | U | V |
| Class A | 2.7% | 4.5% | 4.2% |
| Class B | 2.6% | 4.8% | 3.8% |
| Class C | 2.6% | 5.3% | 5.3% |
| Class D | 2.8% | 4.6% | 4.1% |
| Class E | | | |
| Class F | 1.6% | 2.5% | 2.1% |

TABLE 20-continued

| | Random Access HE | | |
|---|---|---|---|
| | Y | U | V |
| Overall | 2.5% | 4.3% | 3.9% |
| | 2.8% | 4.4% | 3.9% |
| Enc Time [%] | | 97% | |
| Dec Time [%] | | 99% | |

TABLE 21

| | Low Delay P HE | | |
|---|---|---|---|
| | Y | U | V |
| Class A | | | |
| Class B | 1.2% | 3.0% | 2.2% |
| Class C | 1.6% | 3.7% | 3.8% |
| Class D | 2.3% | 5.2% | 4.9% |
| Class E | −0.2% | 2.0% | 0.7% |
| Class F | 2.7% | 2.4% | 2.2% |
| Overall | 1.6% | 3.3% | 2.9% |
| | 1.5% | 3.3% | 2.7% |
| Enc Time [%] | | 98% | |
| Dec Time [%] | | 99% | |

Figure 11:
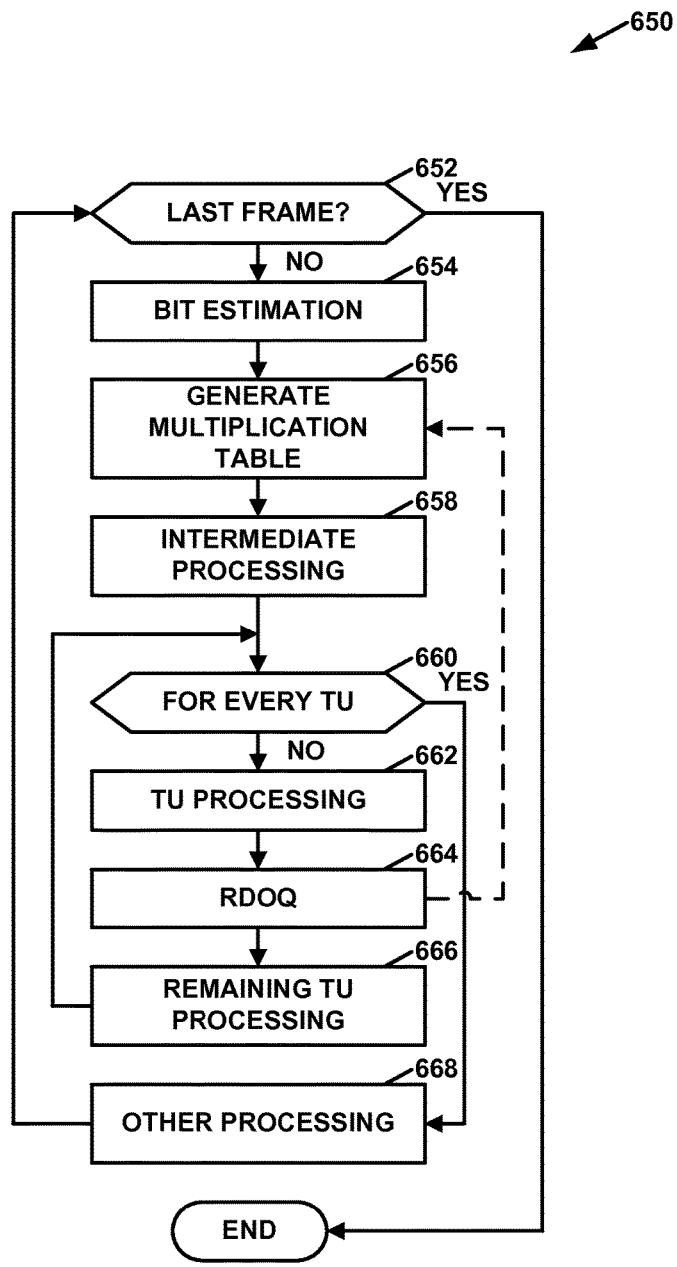
FIG. 11 is a flowchart illustrating another example encoding operation, in accordance with the techniques of this disclosure.

FIG. 11 is a flowchart illustrating an example encoding operation 650, in accordance with one or more techniques of this disclosure. FIG. 11 is primarily for the purpose of illustrating the modules involved in RDOQ. Consequently, some processes are omitted from the example of FIG. 11 and simplified as blocks such as "intermediate processing" and "other processing." Some video encoders may, after performing some intermediate processing such as CU/PU split, mode decision, inter/intra prediction, etc., for every TU, perform bit estimation by calculating the entropy of each context model. The conventional video encoder may then perform RDOQ using the estimated bits. Consequently, such video encoders may perform bit estimation for every TU and during RDOQ the cost of rate ($\lambda \cdot R$) may need to be calculated all the time.

In contrast, video encoder 20 may, when performing operation 650 of FIG. 11, perform bit estimation only once at the beginning of encoding a picture. Video encoder 20 may then generate a multiplication table (for $\lambda \cdot R$) for each of the context models. Later, when video encoder 20 performs the RDOQ algorithm, video encoder 20 may look up a value in the multiplication table to calculate the RD cost.

In the example of FIG. 11, video encoder 20 may determine whether the current frame is the last frame (652). In response to determining that the current frame is not the last frame ("NO" of 652), video encoder 20 may perform a bit estimation operation (654). When video encoder 20 performs the bit estimation operation, video encoder 20 may determine, based at least in part on the entropies of the context models used in the previous frame, the entropies of each context model used in the current frame. For each respective context model used in the current frame, video encoder 20 may use the entropy of the respective context model to determine a value of $R_{level}$, a value of $R_{sig\_map}$, a value of $R_{positionX}$, and a value of $R_{positionY}$ for each applicable quantized level, significance map flag, last significant coefficient (LSC) position X and LSC position Y, respectively. As described above, $R_{level}$ is the number of bits estimated to encode a quantized level. $R_{sig\_map}$ is the number of bits estimated to encode a significance map of a coefficient. $R_{positionX}$ and $R_{positionY}$ are the number of bits estimated to encode the position of the last significant coefficient.

After performing the bit estimation operation, video encoder 20 may generate a multiplication table (656). The multiplication table may specify a value of $\lambda \cdot R_{level}$ for each combination of a context and a quantized level value. In addition, the multiplication table may specify a value of $\lambda \cdot R_{sig\_map}$ for each combination of a context and a significance map flag value. The multiplication table may also specify a value of $\lambda \cdot R_{positionX}$ for each combination of a context and an X coordinate of a LSC. The multiplication table may also specify a value of $\lambda \cdot R_{positionY}$ for each combination of a context and a Y coordinate of a LSC.

Following generation of the multiplication table, video encoder 20 may perform intermediate processing (658). The intermediate processing may include partitioning the current frame into CUs, partitioning CUs into PUs and TUs, selecting inter or intra prediction modes for the PUs, and so on.

Video encoder 20 may then determine whether every TU of the current frame has been processed (660). In response to determining that not every TU of the current frame has been processed ("NO" of 660), video encoder 20 may perform TU processing for a current TU (662). When video encoder 20 performs TU processing for the current TU, video encoder 20 may apply one or more transforms to the residual sample blocks of the TU.

Video encoder 20 may then perform RDOQ on the coefficient blocks of the current TU (664). When video encoder 20 performs RDOQ on a coefficient block of the current TU, video encoder 20 may determine an optimal quantized value for each coefficient of the coefficient block. When determining an optimal quantized value for a particular coefficient, video encoder 20 may use the multiplication table to look up a value of $\lambda \cdot R_{level}$ for a current quantized level context and a quantized level for the particular coefficient. Furthermore, when determining the optimal quantized value for the particular coefficient, video encoder 20 may use the multiplication table to look up a value of $\lambda \cdot R_{sig\_map}$ for a current significance map flag context and a value of the significance map flag for the particular coefficient. In addition, when determining the optimal last significant coefficient, video encoder 20 may use the multiplication table to look up a value of $\lambda \cdot R_{positionX}$ for a current LSC x-coordinate context and an LSC x-coordinate of the LSC. When determining the optimal last significant coefficient, video encoder 20 may use the multiplication table to look up a value of $\lambda \cdot R_{positionY}$ for a current LSC y-coordinate context and an LSC y-coordinate of the LSC. The dashed arrow in the example of FIG. 11 indicates the use of the multiplication table during RDOQ. By looking up values of $\lambda \cdot R_{level}$, $\lambda \cdot R_{sig\_map}$, $\lambda \cdot R_{positionX}$, and $\lambda \cdot R_{positionY}$ when performing RDOQ instead of performing double point multiplications to determine the values of $\lambda \cdot R_{level}$, $\lambda \cdot R_{sig\_map}$, $\lambda \cdot R_{positionX}$, and $\lambda \cdot R_{positionY}$, the computation time of performing RDOQ may be decreased.

After performing RDOQ on the coefficient blocks of the current TU, video encoder 20 may perform any remaining TU processing (666). The remaining TU processing may include CABAC encoding syntax elements that indicate quantized values of coefficients of the current TU. Video encoder 20 may then determine again whether every TU of the current frame has been processed (660). In response to determining that every TU has been processed for the current frame ("YES" of 660), video encoder 20 may perform other processing for the current frame (668). The other processing for the current frame may include loop filtering, bitstream generation, and generating the reconstructed frame for next frame's prediction, and so on. After performing the other processing for the current frame, video encoder 20 may determine again whether the current frame is the last frame (652). If the current frame is not the last frame ("NO" of 652), video encoder 20 may perform actions 654-668 with regard to a next frame. Otherwise, in response to determining that the current frame is the last frame ("YES" of 652), video encoder 20 may end operation 650.

Figure 12:
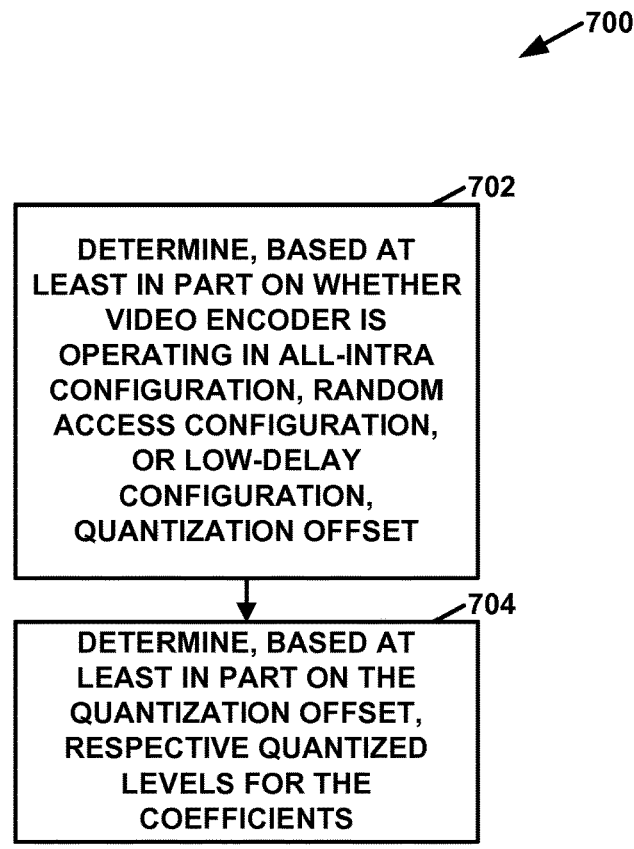
FIG. 12 is a flowchart illustrating another example coding operation, in accordance with the techniques of this disclosure.

In this way, quantization unit 106 may determine, based at least in part on entropies of context models of a previous frame, rate values for the context models. Furthermore, quantization unit 160 may generate a table that indicates, for each of the context models, a value of $\lambda$ multiplied by the rate value for the context model, where $\lambda$ is a fixed value. Determining the rate-distortion costs of quantizing the coefficient to be the initial quantized level for the coefficient, the initial quantized level minus one, and zero may comprise determining, based at least in part on the values in the table, the rate-distortion costs of quantizing the coefficient to be the initial quantized level for the coefficient, the initial quantized level minus one, and zero FIG. 12 is a flowchart illustrating an example coding operation 700, in accordance with the techniques of this disclosure. Video encoder 20 may operate in various coding modes, such as All Intra (AI) mode, random access (RA) mode, low delay B (LB) mode and low delay P (LP) mode. In the All Intra configuration (i.e., the intra-only configuration) each picture in a video sequence is encoded as an instantaneous decoding refresh (IDR) picture. An IDR picture contains only I slices. In the RA configuration, intra pictures are inserted into the bitstream cyclically. Furthermore, in the RA configuration, a first intra picture of a video sequence is encoded as an IDR picture and the other intra pictures are encoded as non-IDR pictures. In the RA configuration, pictures located between successive intra pictures in the display order are encoded as B pictures. The generalized P and B (GPB) picture is used as the lowest temporal layer that can refer to I or GPB picture for inter prediction. The second and third temporal layers may consist of referenced B pictures, and the highest temporal layer contains non-referenced B picture only. The QP of each inter coded picture may be derived by adding offset to the QP of an intra coded picture depending on the temporal layer. A reference picture list combination may be used for management and entropy coding of reference picture index.

In the low delay configurations (i.e., the low delay B configuration and the low delay P configuration), only the first picture in a video sequence is encoded as IDR picture. In the low-delay B configuration, the other successive pictures shall be encoded as B pictures. In the low-delay P configuration, the other successive pictures shall be encoded as P pictures. The B or P pictures (i.e., generalized P or B (GPB) pictures) use only the reference pictures, each of whose picture order count (POC) values is smaller than that of the current picture (i.e., all reference pictures in RefPicList0 and RefPicList1 shall be temporally previous in display order relative to the current picture). In the low delay B and P configurations, the contents of RefPicList0 and RefPicList1 are identical.

In the example of FIG. 12, a video coder (such as video encoder 20 or video decoder 30) may determine, based at least in part on whether the video encoder is operating in an all-intra configuration, a random access configuration, or a low-delay configuration, a quantization offset (702). Furthermore, the video coder may determine, based at least in part on the quantization offset, respective quantized levels for the coefficients (704).

In some examples, the quantization offset is equal to ½ when the video encoder is operating in the all-intra configuration or the random access configuration. In such examples, the quantization offset is equal to ½ when the video encoder is operating in the low-delay configuration and the coefficients are associated with an intra slice. Furthermore, in such examples, the quantization offset is equal to ⅙ when the video encoder is operating in the low-delay configuration and the coefficients are associated with an inter slice.

Table 22, below, illustrates an example performance comparison for different offsets and RDOQ off at different configurations of HEVC, such as All Intra (AI), random access (RA), low delay B (LB) and low delay P (LP). That is, Table 22, below, compares the performances of different quantization offsets and RDOQ off. From Table 22 another way of generating the quantization offset is obtained. For AI and RA configurations, a quantization offset ½ is used as it may give the best performance. For LB and LP configuration, intra slice should use the quantization offset ½ and inter slice should use the quantization offset ⅙ because it gives the best performance. Tables 10-22 show that by choosing an appropriate quantization offset, RD performance can approximate that of RDOQ with reduced complexity.

TABLE 22

|    | Offset ½ | Offset ⅓ (intra) and ⅙ (inter) | Offset ½ (intra) and ⅙ (inter) | RDOQ off |
|----|----------|-------------------------------|-------------------------------|----------|
| AI | 1%       | 2.4%                          | 1%                            | 5.7%     |
| RA | 1.7%     | 3.6%                          | 2.5%                          | 5.3%     |
| LB | 2.7%     | 2.1%                          | 1.7%                          | 3.5%     |
| LP | 3%       | 1.9%                          | 1.6%                          | 3.4%     |

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining a quantization offset such that the quantization offset has different values depending on which of a first configuration and a second configuration a video encoder is encoding a video sequence, the video sequence comprising a plurality of pictures, the first configuration being an all-intra configuration or a random access configuration, the second configuration being a low-delay configuration, wherein:
   in the all-intra configuration, each picture of the video sequence is encoded as an instantaneous decoding refresh (IDR) picture,
   in the random access configuration, the video sequence includes inter pictures and intra pictures that are inserted into the video sequence cyclically, and
   in the low delay configuration, only the first picture in the video sequence is encoded as an IDR picture and either successive pictures in the video sequence shall be encoded as B pictures or the successive pictures shall be encoded as P pictures; and
   for each coding unit (CU) of each picture of the video sequence, encoding, by the video encoder, the CU, wherein encoding the CU comprises determining a quantized level for a coefficient of a coefficient block of a transform unit (TU) of the CU as:

$$z = \left\lfloor \frac{|W|+f}{\Delta} \right\rfloor \cdot \text{sign}(W)$$

where z is the quantized level for the coefficient, w is the initial value of the coefficient, A is a quantization step and f is the quantization offset, denotes rounding to the nearest integer towards minus infinity and sign( ) is a function that returns the sign of the initial value of the respective coefficient and wherein the quantization offset is always equal to one-half (½) when the video encoder is encoding the video sequence in the all-intra configuration or the random access configuration, the quantization offset is always equal to ½ whenever the video encoder is encoding the video sequence in the low-delay configuration and the coefficients are associated with an intra slice, and the quantization offset is always equal to a particular value whenever the video encoder is encoding the video sequence in the low-delay configuration and the coefficients are associated with an inter slice, wherein the particular value is different than ½.

2. The method of claim 1, wherein encoding the CU includes determining respective quantized levels for respective coefficients of the coefficient block in a reverse diagonal scan order.

3. The method of claim 1, further comprising:
determining, based at least in part on costs associated with respective quantized levels for coefficients of the coefficient block, an optimal last significant coefficient; and
entropy encoding, based at least in part on the optimal last significant coefficient, a significance map of the coefficient block.

4. The method of claim 3, wherein the costs associated with the quantized levels include rate distortion costs associated with selecting each one of the coefficients as a last significant coefficient.

5. The method of claim 1, further comprising applying one or more transforms to a residual sample block in order to generate the coefficient block.

6. The method of claim 1, further comprising:
entropy encoding quantized levels for the coefficients of the coefficient block that have positions within the coefficient block that are before the position within the coefficient block of a last significant coefficient; and
outputting the bitstream, the bitstream including the entropy-encoded quantized levels.

7. The method of claim 1, the method being executable on a wireless communication device, wherein the wireless communication device comprises:
data storage medium configured to store the video data;
a processor configured to execute instructions to process the video data stored in the data storage medium; and
a transmitter to transmit the encoded coding unit of video data.

8. The method of claim 7, wherein the wireless communication device is a cellular telephone and the encoded coding unit of video data is transmitted by the transmitter and modulated according to a communication standard.

9. The method of claim 1, wherein the particular value is equal to ⅙.

10. A video encoding device comprising: a data storage medium configured to store video data; and one or more processors configured to:
determine a quantization offset such that the quantization offset has different values depending on which of a first configuration and a second configuration a video encoder is encoding a video sequence, the video sequence comprising a plurality of pictures, the first configuration being an all-intra configuration or a random access configuration, the second configuration being a low-delay configuration, wherein:
in the all-intra configuration, each picture of the video sequence is encoded as an instantaneous decoding refresh (IDR) picture,
in the random access configuration, the video sequence includes inter pictures and intra pictures that are inserted into the video sequence cyclically, and
in the low delay configuration, only the first picture in the video sequence is encoded as an IDR picture and either successive pictures in the video sequence shall be encoded as B pictures or the successive pictures shall be encoded as P pictures; and
for each coding unit (CU) of each picture of the video sequence, encode, using the video encoder, the CU of the video data, wherein encoding the CU comprises determine a quantized level for a coefficient of a coefficient block of a transform unit (TU) of the CU as:

$$z = \left\lfloor \frac{|W|+f}{\Delta} \right\rfloor \cdot \text{sign}(W)$$

where z is the quantized level for the coefficient, w is the initial value of the coefficient, A is a quantization step and f is the quantization offset, [.] denotes rounding to the nearest integer towards minus infinity and sign ( ) is a function that returns the sign of the initial value of the respective coefficient, wherein the quantization offset is always equal to one half (½) when the video encoder is encoding the video sequence in the all-intra configuration or the random access configuration, the quantization offset is always equal to ½ whenever the video encoder is encoding the video sequence in the low-delay configuration and the coefficients are associated with an intra slice, and the quantization offset is always equal to a particular value whenever the video encoder is encoding the video sequence in the low-delay configuration and the coefficients are associated with an inter slice, wherein the particular value is different than ½.

11. The video encoding device of claim 10, wherein the one or more processors are configured to determine quantized levels for respective coefficients of the coefficient block in a reverse diagonal scan order.

12. The video encoding device of claim 10, wherein the one or more processors are configured to:
determine, based at least in part on costs associated with respective quantized levels for coefficients of the coefficient block, an optimal last significant coefficient; and
entropy encode, based at least in part on the optimal last significant coefficient, a significance map of the coefficient block.

13. The video encoding device of claim 12, wherein the costs associated with the respective quantized levels include rate distortion costs associated with selecting each one of the respective coefficients as a last significant coefficient.

14. The video encoding device of claim 10, wherein the one or more processors are configured to apply one or more transforms to a residual sample block in order to generate the coefficient block.

15. The video encoding device of claim 10, wherein the one or more processors are further configured to:
entropy encode quantized levels for the coefficients of the coefficient block that have positions within the coefficient block that are before the position within the coefficient block of a last significant coefficient; and
output the bitstream, the bitstream including the entropy-encoded quantized levels.

16. The device of claim 10, wherein the device is a wireless communication device, further comprises a transmitter to transmit the encoded coding unit of video data.

17. The device of claim 16, wherein the wireless communication device is a cellular telephone and the encoded coding unit of video data is transmitted by the transmitter and modulated according to a communication standard.

18. The video encoding device of claim 10, wherein the particular value is equal to ⅙.

19. A video encoding device comprising:
means for determining a quantization offset such that the quantization offset has different values depending on which of a first configuration and a second configuration a video encoder is encoding a video sequence, the video sequence comprising a plurality of pictures, the first configuration being an all-intra configuration or a random access configuration, the second configuration being a low-delay configuration, wherein:
in the all-intra configuration, each picture of the video sequence is encoded as an instantaneous decoding refresh (IDR) picture,
in the random access configuration, the video sequence includes inter pictures and intra pictures that are inserted into the video sequence cyclically, and
in the low delay configuration, only the first picture in the video sequence is encoded as an IDR picture and either successive pictures in the video sequence shall be encoded as B pictures or the successive pictures shall be encoded as P pictures; and
means for encoding, using the video encoder, for each coding unit (CU) of each picture of the video sequence, the CU, wherein encoding the CU comprises determining a quantized level for a coefficient of a coefficient block of a transform unit (TU) of the CU as:

$$z = \left\lfloor \frac{|W| + f}{\Delta} \right\rfloor \cdot \text{sign}(W)$$

where z is the quantized level for the coefficient, w is the initial value of the coefficient, A is a quantization step and f is the quantization offset, [.] denotes rounding to the nearest integer towards minus infinity and sign ( ) is a function that returns the sign of the initial value of the respective coefficient, wherein the quantization offset is always equal to one half (½) when the video encoder is encoding the video sequence in the all-intra configuration or the random access configuration, the quantization offset is always equal to ½ whenever the video encoder is encoding the video sequence in the low-delay configuration and the coefficients are associated with an intra slice, and the quantization offset is always equal to a particular value whenever the video encoder is encoding the video sequence in the low-delay configuration and the coefficients are associated with an inter slice, wherein the particular value is different than ½.

20. The video encoding device of claim 19, wherein the video encoding device comprises at least one of:
an integrated circuit;
a microprocessor; or
a wireless communication device.

21. The video encoding device of claim 19, further comprising a camera configured to capture the video data.

22. The video encoding device of claim 19, wherein the particular value is equal to ⅙.

23. A non-transitory computer-readable storage medium that stores instructions that, when executed, configure a video encoding device to:
determine a quantization offset such that the quantization offset has different values depending on which of a first configuration and a second configuration a video encoder is encoding a video sequence, the video sequence comprising a plurality of pictures, the first configuration being an all-intra configuration or a random access configuration, the second configuration being a low-delay configuration, wherein:
in the all-intra configuration, each picture of the video sequence is encoded as an instantaneous decoding refresh (IDR) picture,
in the random access configuration, the video sequence includes inter pictures and intra pictures that are inserted into the video sequence cyclically, and in the low delay configuration, only the first picture
in the video sequence is encoded as an IDR picture and either successive pictures in the video sequence shall be encoded as B pictures or the successive pictures shall be encoded as P pictures; and for each coding unit (CU) of each picture of the video sequence, encode, using the video encoder, the CU, wherein encoding the CU comprises determining a quantized level for a coefficient of a coefficient block of a transform unit (TU) of the CU as:

$$z = \left\lfloor \frac{|W| + f}{\Delta} \right\rfloor \cdot \text{sign}(W)$$

where z is the quantized level for the coefficient, w is the initial value of the coefficient, A is a quantization step and f is the quantization offset, [.] denotes rounding to the nearest integer towards minus infinity and sign( ) is a function that returns the sign of the initial value of the respective coefficient, wherein the quantization offset is always equal to one half (½) when the video encoder is encoding the video sequence in the all-intra configuration or the random access configuration, the quantization offset is always equal to ½ whenever the video encoder is encoding the video sequence in the low-delay configuration and the coefficients are associated with an intra slice, and the quantization offset is always equal to a particular value whenever the video encoder is encoding the video sequence in the low-delay configuration and the coefficients are associated with an inter slice, wherein the particular value is different than ½.

24. The non-transitory computer-readable storage medium of claim 23, wherein the particular value is equal to ⅙.

* * * * *